(12) United States Patent
Yamada et al.

(10) Patent No.: US 11,368,959 B2
(45) Date of Patent: Jun. 21, 2022

(54) BASE STATION APPARATUS, TERMINAL APPARATUS, AND COMMUNICATION METHOD

(71) Applicant: Sharp Kabushiki Kaisha, Sakai (JP)

(72) Inventors: Ryota Yamada, Sakai (JP); Kazuyuki Shimezawa, Sakai (JP); Hiromichi Tomeba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 16 days.

(21) Appl. No.: 15/524,201

(22) PCT Filed: Nov. 2, 2015

(86) PCT No.: PCT/JP2015/080924
§ 371 (c)(1),
(2) Date: May 3, 2017

(87) PCT Pub. No.: WO2016/072389
PCT Pub. Date: May 12, 2016

(65) Prior Publication Data
US 2017/0359811 A1 Dec. 14, 2017

(30) Foreign Application Priority Data
Nov. 6, 2014 (JP) .............................. JP2014-225690

(51) Int. Cl.
*H04W 72/04* (2009.01)
*H04W 24/10* (2009.01)
(Continued)

(52) U.S. Cl.
CPC ........ *H04W 72/046* (2013.01); *H04B 7/0469* (2013.01); *H04J 1/00* (2013.01);
(Continued)

(58) Field of Classification Search
CPC ........... H04B 7/0469; H04J 1/00; H04J 11/00; H04L 1/0053; H04L 5/0035;
(Continued)

(56) References Cited

U.S. PATENT DOCUMENTS 8,576,822 B2 11/2013 Yoon et al.
8,837,452 B2 9/2014 Yoon et al.
(Continued)

FOREIGN PATENT DOCUMENTS

EP 2925042 A1 9/2015
JP 2013-517671 A 5/2013
(Continued)

OTHER PUBLICATIONS

3GPP TS 36.213 V12.3.0, 3rd Generation Partnership Project, Technical Specification Group Radio Access Network, Evolved Universal Terrestrial Radio Access (EUTRA), Physical layer procedures (Release 12), Sep. 2014.

*Primary Examiner* — Asad M Nawaz
*Assistant Examiner* — Kai Chang
(74) *Attorney, Agent, or Firm* — ScienBiziP, P.C.

(57) ABSTRACT

The present invention provides a base station apparatus, a terminal apparatus, and a communication method, which are capable of throughput improvement. A base station apparatus that communicates with a terminal apparatus, includes a higher layer processing unit that configures a CSI process that is a configuration relating to reporting of a channel state information (CSI), for the terminal apparatus for which a prescribed transmission mode is configured, in which the CSI process includes a configuration of a CSI reference signal and a configuration relating to two different code books. A terminal apparatus that communicates with a base station apparatus, includes a higher layer processing unit for which a CSI process that is a configuration relating to
(Continued)

reporting of channel state information (CSI) is configured by the base station apparatus, and a transmission unit that transmits the CSI based on the CSI process, in which the CSI information includes a configuration of a CSI reference signal and a configuration relating to two different code books.

20 Claims, 3 Drawing Sheets

(51) Int. Cl.
  *H04J 1/00* (2006.01)
  *H04J 11/00* (2006.01)
  *H04L 5/00* (2006.01)
  *H04B 7/0456* (2017.01)
  *H04L 1/00* (2006.01)
  *H04W 88/02* (2009.01)
  *H04W 88/08* (2009.01)

(52) U.S. Cl.
  CPC ............ *H04J 11/00* (2013.01); *H04L 1/0053* (2013.01); *H04L 5/005* (2013.01); *H04L 5/0035* (2013.01); *H04L 5/0048* (2013.01); *H04L 5/0057* (2013.01); *H04W 24/10* (2013.01); *H04L 5/0092* (2013.01); *H04W 88/02* (2013.01); *H04W 88/08* (2013.01)

(58) Field of Classification Search
  CPC ..... H04L 5/0048; H04L 5/005; H04L 5/0057; H04L 5/0092; H04W 24/10; H04W 72/046; H04W 88/02; H04W 88/08
  See application file for complete search history.

(56) References Cited

U.S. PATENT DOCUMENTS

| | | | |
|---|---|---|---|
| 8,989,114 B2 | 3/2015 | Kim et al. | |
| 9,119,209 B2 | 8/2015 | Nam et al. | |
| 9,236,990 B2 | 1/2016 | Kim et al. | |
| 9,380,581 B2 | 6/2016 | Yoon et al. | |
| 9,509,390 B2 | 11/2016 | Kim et al. | |
| 9,572,063 B2* | 2/2017 | Etemad | H04L 41/082 |
| 9,673,883 B2* | 6/2017 | Zhao | H04W 24/10 |
| 9,680,552 B2 | 6/2017 | Ko et al. | |
| 9,814,030 B2* | 11/2017 | Park | H04W 72/042 |
| 9,893,866 B2 | 2/2018 | Yoon et al. | |
| 9,942,785 B2 | 4/2018 | Gao | |
| 10,003,391 B2 | 6/2018 | Liang | |
| 10,218,485 B2 | 2/2019 | Yoon et al. | |
| 11,039,329 B2* | 6/2021 | Marinier | H04B 7/0617 |
| 2011/0176634 A1 | 7/2011 | Yoon et al. | |
| 2011/0194551 A1* | 8/2011 | Lee | H04B 7/0626 370/342 |
| 2012/0076023 A1* | 3/2012 | Ko | H04B 7/0486 370/252 |
| 2012/0140649 A1* | 6/2012 | Choudhury | H04W 24/10 370/252 |
| 2012/0287875 A1* | 11/2012 | Kim | H04W 76/27 370/329 |
| 2013/0258964 A1 | 10/2013 | Nam et al. | |
| 2013/0336214 A1* | 12/2013 | Sayana | H04B 7/063 370/328 |
| 2014/0029696 A1 | 1/2014 | Yoon et al. | |
| 2014/0204853 A1* | 7/2014 | Ko | H04L 5/0073 370/329 |
| 2014/0355711 A1 | 12/2014 | Yoon et al. | |
| 2015/0063177 A1* | 3/2015 | Kim | H04B 7/024 370/280 |
| 2015/0092768 A1* | 4/2015 | Ng | H04W 48/16 370/350 |
| 2015/0155992 A1 | 6/2015 | Kim et al. | |
| 2015/0207600 A1* | 7/2015 | Park | H04L 5/0048 370/329 |
| 2015/0222399 A1* | 8/2015 | Cheng | H04W 48/08 370/329 |
| 2015/0249981 A1* | 9/2015 | Wu | H04W 24/10 370/329 |
| 2015/0289155 A1 | 10/2015 | Gao | |
| 2015/0312927 A1* | 10/2015 | Ko | H04L 5/005 370/336 |
| 2015/0358962 A1* | 12/2015 | Lee | H04W 72/0446 370/336 |
| 2015/0381254 A1 | 12/2015 | Liang | |
| 2016/0050006 A1 | 2/2016 | Ko et al. | |
| 2016/0094287 A1 | 3/2016 | Kim et al. | |
| 2016/0174093 A1* | 6/2016 | Zhou | H04W 24/10 370/252 |
| 2016/0242060 A1* | 8/2016 | Kakishima | H04B 7/0626 |
| 2016/0249244 A1* | 8/2016 | Xia | H04L 1/00 |
| 2016/0301505 A1* | 10/2016 | Furuskog | H04W 72/08 |
| 2016/0373231 A1 | 12/2016 | Yoon et al. | |
| 2017/0078011 A1 | 3/2017 | Kim et al. | |
| 2017/0237535 A1* | 8/2017 | Park | H04B 7/0478 370/329 |
| 2018/0139029 A1 | 5/2018 | Yoon et al. | |
| 2018/0287684 A1 | 10/2018 | Liang | |

FOREIGN PATENT DOCUMENTS

| | | |
|---|---|---|
| WO | 2011/115421 A2 | 9/2011 |
| WO | 2014/079329 A1 | 5/2014 |
| WO | 2014/163169 A1 | 10/2014 |
| WO | 2014/171658 A1 | 10/2014 |

* cited by examiner

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

In a communication system, such as Long Term Evolution (LTE) or LTE-Advanced (LTE-A), which is developed by Third Generation Partnership Project (3GPP), a Modulation and Coding Scheme (MCS) and the number of spatial multiplexes (the number of layers or a rank) are adaptively controlled according to a situation of a transfer path between a base station apparatus (a base station, a transmission station, a transmission point, a downlink transmission apparatus, an uplink reception apparatus, a transmit antenna group, a transmit antenna port group, a component carrier, or an eNodeB) and a terminal apparatus (a mobile station device, a reception station, a reception point, an uplink transmission device, a downlink reception device, a mobile terminal, a receive antenna group, a receive antenna port group, or a User Equipment (UE)), in order to realize efficient data transfer.

For example, in LTE, in a case where an MCS, the number of spatial multiplexes, and the like for a downlink transmission signal (for example, a Physical Downlink Shared CHannel (PDSCH)) that is transmitted in downlink are adaptively controlled, the terminal apparatus calculates received quality information (which, alternatively, is also referred to as Channel State Information (CSI), with reference to a Downlink Reference Signal (DLRS) that is included in the downlink transmission signal which is transmitted from the base station apparatus, and reports the calculated received quality information to the base station apparatus through an uplink channel (for example, a PUCCH or a PUSCH). The base station apparatus transmits the downlink transmission signal on which the MCS or the number of spatial multiplexes, which is selected, taking into consideration the received quality information and the like which are transmitted by the terminal apparatus, is performed. A Rank Indicator (RI) indicating the suitable number of spatial multiplexes, a Preceding Matrix Indicator (PMI) indicating a suitable precoder, a Channel Quality Indicator (CQI) indicating a suitable transfer rate, and the like correspond to the received quality information. The received quality information is disclosed in NFL 1.

CITATION LIST

Non Patent Literature

NPL 1: 3GPP TS36.213. V12.3.0, 3rd Generation Partnership Project: Technical Specification Group Radio Access Network: Evolved Universal Terrestrial Radio Access (E-UTRA), Physical layer procedures (Release 12), September 2014.

SUMMARY OF INVENTION

Technical Problem

In recent years, many transmit antennas or various antenna arrangements have been under study for the purpose of improvement in throughput and the like. However, in the technology that is disclosed in NPL 1, because it is difficult for the base station apparatus to know a channel state in the case of many transmit antennas or various antenna arrangements, there is a likelihood that suitable transmission to the terminal apparatus will not be made. In this case, there is a problem in that improvement in throughput or coverage enlargement is limited. An object of the present invention, which was made in view of this situation, is to provide a base station apparatus, a terminal apparatus, and a communication method which are capable of throughput improvement.

Solution to Problem

In order to deal with the problem described above, the following constitutions of a base station apparatus, a terminal apparatus and a communication method are provided.

According to an aspect of the present invention, there is provided a base station apparatus that communicates with a terminal apparatus, including a higher layer processing unit that configures a plurality of CSI processes which are configurations relating to requesting of a channel state information (CSI), for the terminal apparatus for which a prescribed mode is configured, and a reception unit that receives the CSI based on the CSI process, in which a prescribed CSI process, among the plurality of CSI processes, is associated with a precoding index matrix indicator (PMI) of a different CSI process, and a PMI in the prescribed CSI process is decided based on the PMI of the different CSI process.

Furthermore, in the base station apparatus according to the present invention, the different CSI process is a PMI reference CSI process indicating a CSI process with which the PMI is associated and the PMI reference CSI process is configured for the prescribed CSI process.

Furthermore, in the base station apparatus according to the present invention, a CSI process set indicating association relating to at least the PMI is configured, and the CSI process set includes the prescribed CSI process and the different CSI process.

Furthermore, in the base station apparatus according to the present invention, in a case where the different CSI process is configured for the prescribed CSI process, the PMI in the prescribed CSI process is selected on the assumption of the PMI that is selected with the different CSI process.

Furthermore, in the base station apparatus according to the present invention, in a case where the different CSI process is configured for the prescribed CSI process, if 8 CSI-RS ports are configured, or if an alternative code book is enabled for 4 antenna ports, a first PMI and a second PMI in the prescribed CSI process are selected on the assumption of the first PMI and the second PMI that are selected with the different CSI process.

Furthermore, in the base station apparatus according to the present invention, in a case where the different CSI process is configured for the prescribed CSI process, if 8 CSI-RS ports are configured, or if an alternative code book is enabled for 4 antenna ports, a first PMI in the presented CSI process is selected on the assumption of the first PMI that is selected with the different CSI process, a second PMI in the prescribed CSI process is selected on the assumption of the second PMI that is selected with the different PMI reference CSI process.

Furthermore, in the base station apparatus according to the present invention, a code book that is used when a PMI is obtained with the prescribed CSI process and a code book that is used when the PMI is obtained with the different CSI process are different from each other.

Furthermore, in the base station apparatus according to the present invention, a code book that is used when a PMI is obtained with the prescribed CSI process is a subset of a code book that is used when the PMI is obtained with the different CSI process.

Furthermore, in the base station apparatus according to the present invention, a code book that is used when a first PMI is obtained with the prescribed CSI process is a subset of a code book that is used when the first PMI is obtained with the different CSI process.

Furthermore, in the base station apparatus according to the present invention, in the CSI process set, a PMI in an alternative CSI process is selected on the assumption of a PMI that is selected with a CSI process of which a process ID is the smallest number.

According to another aspect of the present invention, there is provided a terminal apparatus that communicates with a base station apparatus, including a higher layer processing unit for which a plurality of CSI processes that are configurations relating to reporting of a channel state information (CSI), is configured by the base station apparatus, and a transmission unit that transmits the CSI based on the CSI process, in which a prescribed CSI process, among the plurality of CSI processes, is associated with a preceding matrix indicator (PMI) of a different CSI process, and a PMI in the prescribed CSI process is decided based on the PMI of the different CSI process.

Furthermore, in fixe terminal apparatus according to the present invention, the different CSI process is a PMI reference CSI process indicating a CSI process with which the PMI is associated, and the PMI reference CSI process is configured for the prescribed CSI process.

Furthermore, in the terminal apparatus according to the present invention, a CSI process set indicating association relating to at least the PMI is configured, and the CSI process set includes the prescribed CSI process and the different CSI process.

Furthermore, in the terminal apparatus according to the present invention, in a case where the different CSI process is configured for the prescribed CSI Process, the PMI in the prescribed CSI process is selected on the assumption of the PMI that is selected with the different CSI process.

Furthermore, in the terminal apparatus according to the present invention, in a case where the different CSI process is configured for the prescribed CSI process, if 8 CSI-RS ports are configured or if an alternative code book is enabled for 4 antenna ports, a first PMI and a second PMI in the prescribed CSI process are selected on the assumption of the first PMI and the second PMI that are selected with the different CSI process.

Furthermore, in the terminal apparatus according to the present invention, in a case where the different CSI process is configured for the prescribed CSI process, if 8 CSI-RS ports are configured, or if an alternative code book is enabled for 4 antenna ports, a first PMI in the prescribed CSI process is selected on the assumption of the first PMI that is selected with the different CSI process, a second PMI in the prescribed CSI process is selected on the assumption of the second PMI that is selected with the different PMI reference CSI process.

Furthermore, in the terminal apparatus according to the present invention, a code book that is used when a PMI is obtained with the prescribed CSI process and a code book that is used when the PMI is obtained with the different CSI process are different from each other.

Furthermore, in the terminal apparatus according to the present invention, a code book that is used when a PMI is obtained with the prescribed CSI process is a subset of a code book that is used when the PMI is obtained with the different CSI process.

Furthermore, in the terminal apparatus according to the present invention, a code book that is used when a first PMI is obtained with the prescribed CSI process is a subset of a code book that is used when the first PMI is obtained with the different CSI process.

Furthermore, in the terminal apparatus according to the present invention, in the CSI process set, a PMI in an alternative CSI process is selected on the assumption of a PMI that is selected with a CSI process of which a process ID is the smallest number.

Furthermore, according to still another aspect of the present invention, there is provided a communication method in a base station apparatus that communicates with a terminal apparatus, including a higher layer processing step of configuring a plurality of CSI processes which are configurations relating to reporting of a channel state information (CSI), for the terminal apparatus for which a prescribed mode is configured, and a reception step of receiving the CSI based on the CSI process, in which a prescribed CSI process, among the plurality of CSI processes, is associated with a preceding index matrix indicator (PMI) of a different CSI process, and a PMI in the prescribed CSI process is decided based on the PMI of the different CSI process.

Furthermore, according to still another aspect of the present invention, there is provided a communication method in a terminal apparatus that communicates with a base station apparatus, including a higher layer processing step of causing the base station apparatus to configure a plurality of CSI processes that are configurations relating to reporting of a channel state information (CSI), and a transmission step of transmitting the CSI based on the CSI process, in which a prescribed CSI process, among the plurality of CSI processes, is associated with a preceding matrix indicator (PMI) of a different CSI process, and a PMI in the prescribed CSI process is decided based on the PMI of the different CSI process.

Advantageous Effects of Invention

According to the present invention, a channel state in various environments can be known, and throughput can be improved.

DESCRIPTION OF EMBODIMENTS

A communication system according to the present invention includes a base station apparatus (a transmission apparatus, a cell a transmission point, a transmit antenna group, a transmit antenna port group, a component carrier, or an eNodeB) and a terminal apparatus (a terminal, a mobile terminal, a reception point, a reception terminal, a reception device, a receive antenna group, a receive antenna port group or a UE).

According to the present embodiment, "X/Y" includes the meaning of "X or Y". According to the present embodiment, "X/Y" includes the meaning of "X and Y." According to the present embodiment, "X/Y" includes the meaning of "X and/or Y".

Figure 1:
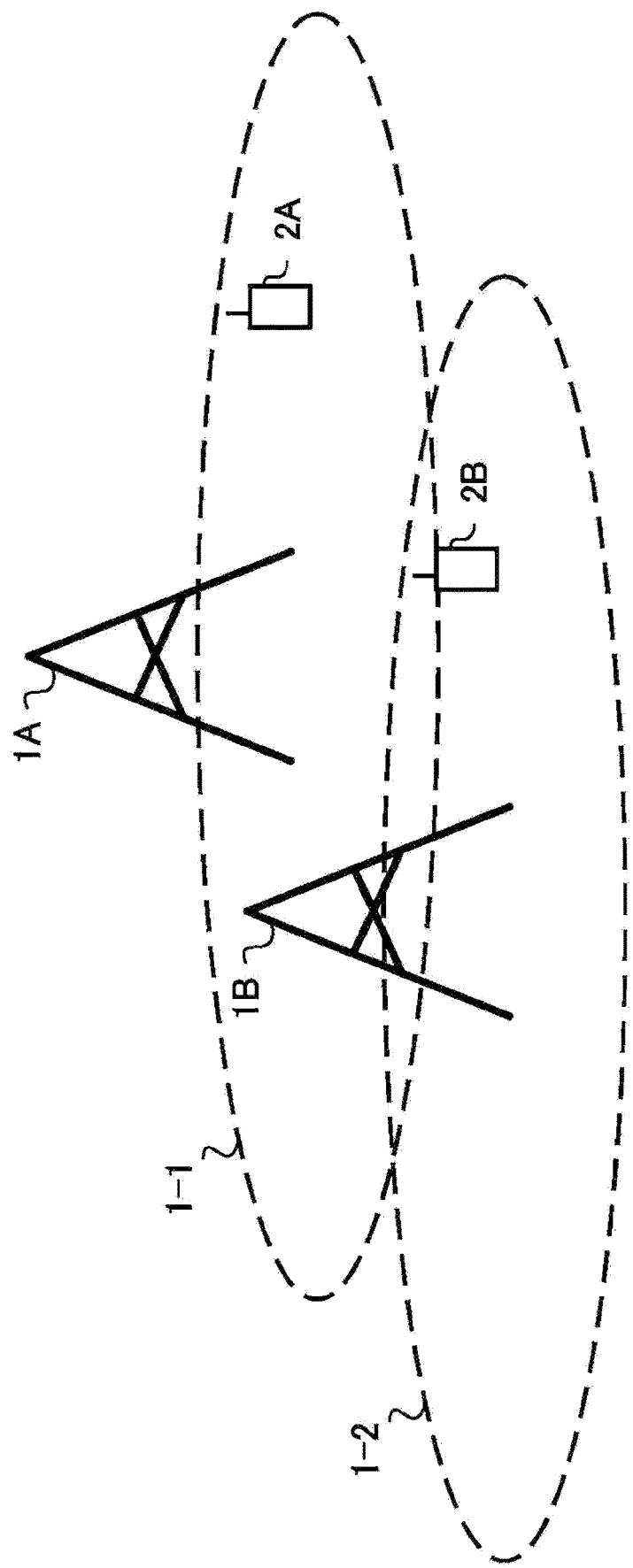
FIG. 1 is a diagram illustrating an example of a communication system according to the present embodiment.

FIG. 1 is a diagram illustrating an example of the communication system according to the present embodiment.

As illustrated in FIG. 1, the communication system according to the present invention includes base station apparatuses 1A and 1B and terminal apparatuses 2A and 2B. Furthermore, coverage 1-1 is a range (a communication area) in which it is possible that the base station apparatus 1A connects to the terminal apparatus. Furthermore, coverage 1-2 is a range (a communication area) in which it is possible that the base station apparatus 1B connects to the terminal apparatus.

In FIG. 1, in uplink wireless communication from the terminal apparatus 2A to the base station apparatus 1A, the following uplink physical channels are used. The uplink physical channel is used to transmit information that is output from a higher layer.

Physical Uplink Control Channel (PUCCH)
Physical Uplink Shared Channel (PUSCH)
Physical Random Access Channel (PRACH)

The PUCCH is used for transmitting Uplink Control Information (UCI). At this point, the Uplink Control Information includes a positive acknowledgement (ACK) or a negative acknowledgement (NACK) (ACK or NACK) of downlink data (a downlink transport block or a Downlink-Shared Channel (DL-SCH)). The ACK or NACK of the downlink data is also referred to as an HARQ-ACK or HARQ feedback.

Furthermore, the Uplink Control Information includes Channel State Information (CSI) for downlink. Furthermore, the Uplink Control Information includes a Scheduling Request (SR) that is used for making a request for a resource for an Uplink-Shared Channel (UL-SCH). A Rank Indicator (RI) indicating the suitable number of spatial multiplexes, a Preceding Matrix Indicator (PMI) indicating s suitable precoder, a Channel Quality Indicator (CQI) indicating a suitable transfer rate, and the like correspond to the Channel State Information.

The Channel Quality Indicator (which is hereinafter referred to as a. CQI value) can be assumed to be a suitable modulation scheme (for example, QPSK, 16 QAM, 64 QAM, 256 QAM, or the like) in a prescribed band (which will be described in detail below) and a code rate. The CQI value can be assumed to be an index (a CQI Index) that is decided with the change scheme and the cord rate. The CQI value can also be assumed to be decided in advance in the system.

It is noted that the Rank Indicator and the Precoding Quality Indicator can be decided in advance in the system. The Rank Indicator and the Preceding Matrix Indicator can be assumed to be an index that is decided in advance with the number of spatial multiplexes or the Preceding Matrix Information. It is noted that values of the Rank Indicator, the Preceding Matrix Indicator, and the Channel Quality Indicator (CQI) are collectively referred to as a CSI value.

The PUSCH is used for transmitting uplink data (an uplink transport block or the UL-SCH). Furthermore, the PUSCH may be used for transmitting the ACK or NACK and/or the Channel State Information, along with the uplink data. Furthermore, the PUSCH may be used for transmitting only the Uplink Control Information.

Furthermore, the PUSCH is used for transmitting an RRC message. The RRC message is a piece of information or a signal that is processed in a Radio Resource Control (RRC) layer. Furthermore, the PUSCH is used for transmitting a MAC Control Element (CE). At this point, the MAC CE is a piece of information or a signal that is processed (transmitted) in a Medium Access Control (MAC) layer.

For example, a power headroom may be included in the MAC CE and may be reported through the PUSCH. That is, a MAC CE field may be used for indicating a power headroom level.

The PRACH is used for transmitting a random access preamble.

Furthermore, in the uplink wireless communication, an Uplink Reference Signal (UL RS) is used as an uplink physical signal. The uplink physical signal is not used tor transmitting the information that is output from the higher layer, but is used by a physical layer. At this point, a Demodulation Reference Signal (DMRS) and a Sounding Reference Signal (SRS) are included in the Uplink Reference Signal.

The DMRS is associated with transmission of the PUSCH or the PUCCH. For example, the base station apparatus 1A uses the DMRS to perform channel reconfiguration of the PUSCH or the PUCCH. The SRS is not associated with the transmission of the PUSCH or the PUCCH. For example, the base station apparatus 1A uses the SRS to measure an uplink channel state.

In FIG. 1, in downlink wireless communication from the base station apparatus 1A to the terminal apparatus 2A, the following downlink physical channels are used. The downlink physical channel is used to transmit the information that is output from the higher layer.

Physical Broadcast Channel (PBCH) (Broadcast Channel)
Physical Control Format Indicator Channel (PCFICH) (Control Format Indicator Channel)
Physical Hybrid automatic repeat request Indicator Channel (PHICH) (HARQ Indicator Channel)
Physical Downlink Control Channel (PDCCH) (Link Control Channel)
Enhanced Physical Downlink Control Channel (EPDCCH) (Enhanced Downlink Control Channel)
Physical Downlink Shared Channel (PDSCH) (Downlink Shared Channel)

The PBCH is used for broadcasting a Master Information Block (MIB) (Broadcast Channel (BCH)) that is used in a shared manner in the terminal apparatus. The PCFICH is used to transmit information that indicates a region (for example, the number of OFDM symbols) that is used in transmission of the PDCCH.

The PHICH is used for transmitting an ACK or NACK of uplink data (a transport block or a codeword) that is received by the base station apparatus 1A. That is, the PHICH is used for transmitting m HARQ indicator (HARQ feedback) indicating the ACK or NACK of the uplink data. Furthermore, the ACK or NACK is also referred to as a HARQ-ACK. The terminal apparatus 2 notifies the higher layer of the received ACK or NACK. The ACK is an ACK indicating that reception is correctly performed, and the NACK is a NACK indicating that reception is not correctly performed. DTX indicates that corresponding data is not present. Furthermore, in a case where the PHICH for the uplink data is not present, the terminal apparatus 2A notifies the higher layer of the ACK.

The PDCCH and the EPDCCH are used for transmitting Downlink Control Information (DCI). At this point, multiple DCI formats are defined for transmission of the Downlink Control Information. That is, a field for the Downlink Control Information is defined in a DCI format and is mapped to an information bit.

For example, DCI format 1A that is used for scheduling of one PDSCH (transmission of one downlink transport block) in one cell is defined as a DCI format for the downlink.

For example, information relating to PDSCH resource allocation, information relating to a Modulation and Coding Scheme (MCS) for the PDSCH, and Downlink Control Information such as a TPC command tor the PUCCH are included in the DCI format for the downlink. At this point, the DCI format for downlink is also referred to as a downlink grant (or a downlink assignment).

Furthermore, for example, DCI format 0 that is used for scheduling of one PUSCH (transmission of one uplink transport block) in one cell is defined as a DCI format for uplink.

For example, information relating to PUSCH resource allocation, information relating to an MCS for the PUSCH, and Uplink Control Information such as a TPC command tor the PUSCH are included in the DCI format for the uplink. The DCI format for the uplink is also referred to as an uplink grant (or an uplink assignment).

Furthermore, the DCI format for the uplink can be used for making a request for the Channel State Information (a CSI request) (which is also referred to as received quality information) for the downlink. The Rank Indicator (RI) indicating the suitable number of spatial multiplexes, the Preceding Matrix Indicator (PMI) indicating a suitable precoder, the Channel Quality Indicator (CQI) indicating a suitable transfer rate, a Preceding type Indicator (PTI) and the like correspond to the Channel State Information.

Furthermore, the DCI format for the uplink can be used for a configuration indicating an uplink resource to which a channel state information report (CSI feedback report) that is fed back by the terminal apparatus to the base station apparatus is mapped. For example, the channel state information report can be used for the configuration indicating the uplink resource in which Channel State Information (Periodic CSI) is periodically reported. The channel state information report can be used for a mode configuration (a CSI report mode) in which the Channel State Information is periodically reported.

For example, the channel state information report can be used for the configuration indicating the uplink resource in which aperiodic Channel State Information (aperiodic CSI) is reported. The channel state information report can be used for the mode configuration (the CSI report mode) in which the Channel State Information is periodically reported. The base station apparatus can configure either the periodic channel state information reporting or the aperiodic channel state information reporting. Furthermore, the base station apparatus can also configure both of the periodic channel state information reporting and the aperiodic channel state information reporting.

Furthermore, the DCI format for the uplink can be used for a configuration indicating a type of channel state information report that is fed back by the terminal apparatus to the base station apparatus. As types of channel state information reports, there are a broadband CSI (for example, a wideband CQI), a narrowband CSI (for example, a subband CQI), and the like.

In a ease where a PDSCH resource is scheduled using the downlink assignment, the terminal apparatus receives the downlink data, on the scheduled PDSCH. Furthermore, in a case where a PUSCH resource is scheduled using the uplink grant, the terminal apparatus transmits the uplink data and/or the Uplink Control Information, on the scheduled PUSCH.

The PDSCH is used for transmitting the downlink data (the downlink transport block or the DL-SCH). Furthermore, the PDSCH is used for transmitting a system information block type-1 message. The system information block type-1 message is cell-specific (cell-peculiar) information.

Furthermore, the PDSCH is used for transmitting a system information message. The system information message includes a system information block X other than a system information block type-1. The system information message is cell-specific (cell-peculiar) information.

Furthermore, the PDSCH is used for transmitting the RRC message. At this point, the RRC message that is transmitted from the base station apparatus may be common to a plurality of terminal apparatuss within a cell. Furthermore, the RRC message that is transmitted from the base station apparatus 1A may be a message (which is also referred to as dedicated signaling) dedicated to a certain terminal apparatus 2. That is, user equipment-specific (user equipment-peculiar) information is transmitted using a message dedicated to a certain terminal apparatus. Furthermore, the PDSCH is used for transmitting the MAC CE.

At this point, the RRC message and/or the MAC CE are also referred to as higher layer signaling.

Furthermore, the PDSCH can be used for making a request for the Channel State Information for the downlink. Furthermore, the PDSCH can be used for transmitting the uplink resource to which the channel state information report (the CSI feedback report) that is fed back by the terminal apparatus to the base station apparatus is mapped. For example, the channel state information report can be used for the configuration indicating the uplink resource in which the Channel State Information (the Periodic CSI) is periodically reported. The channel state information report can be used for the mode configuration (the CSI report mode) in which the Channel State Information is periodically reported.

As types of channel state information reports for the downlink, there are a broadband CSI (for example, a wideband CSI), a narrowband CSI (for example, a subband CSI), and the like. The broadband CSI results from calculating one piece of Channel State Information for a cell system band. The narrowband CSI results from dividing a system band into prescribed units and calculating one piece of Channel State Information for the categorization.

Furthermore, in the downlink wireless communication, a synchronization signal (SS) and a Downlink Reference Signal (DL RS) are used as downlink physical signals. The downlink physical signal is not used to transmit the information that is output from the higher layer, but is used by the physical layer.

The synchronization signal is used for the terminal apparatus to be synchronized to a frequency domain for and a time domain for the downlink. Furthermore, the Downlink Reference Signal is used for the terminal apparatus to perform the channel reconfiguration of the downlink physical channel. For example, the Downlink Reference Signal is used for the terminal apparatus to calculate the Channel State Information for the downlink.

At this point, a Cell-specific Reference Signal (CHS), a UE-specific Reference Signal (URS) associated with the PDSCH, a Demodulation Reference Signal (DMRS) associated with the EPDCCH, a Non-Zero Power Chanel State Information-Reference Signal (NZP CSI-RS), and a Zero Power Chanel State Information-Reference Signal (ZP CSI-RS) are included in the Downlink Reference Signal.

The CRS is transmitted in all bands for a subframe, and is used for performing demodulation of the PBCH, the PDCCH the PHICH, the PCFICH, or the PDSCH. The URS associated with the PDSCH is transmitted in a subframe and a band that are used for transmission of the PDSCH with which the URS is associated, and is used for performing the demodulation of the PDSCH with which the URS is associated.

The DMRS that is associated with the EPDCCH is transmitted in a subframe and a band that are used for transmission of the EPDCCH with which the DMRS is associated. The DMRS is used for performing demodulation of the EPDCCH with which the DMRS is associated.

A resource for the NZP CSI-RS is configured by the base station apparatus 1A. For example, the terminal apparatus 2A performs signal measurement (channel measurement) using the NZP CSI-RS. A resource for the ZP CSI-RS is configured by the base station apparatus 1A. With a zero output, the base station apparatus 1A transmits the ZP CSI-RS. For example, the terminal apparatus 2A performs interference measurement on a resource to which the NZP CSI-RS corresponds.

A resource for the ZP CSI-RS is configured by the base station apparatus 1A. With the zero output, the base station apparatus 1B transmits the ZP CSI-RS. More precisely the base station apparatus 1A does not transmit the ZP CSI-RS. The base station apparatus 1B does not transmit the PDSCH and the EPDCCH on a resource into which the ZP CSI-RS is configured. For example, the terminal apparatus 2B can measure interference in a resource to which the NZP CSI-RS corresponds in a certain cell.

A Multimedia Broadcast multicast service Single Frequency Network (MBSFN) RS is transmitted in all bands in a subframe that is used for transmission of a PMCH. The MBSFN RS is used for performing demodulation of the PMCH. The PMCH is transmitted in an antenna port that is used for transmission of the MBSFN RS.

At this point, the downlink physical channel and the downlink physical signal are also collectively referred to as a downlink signal. Furthermore, the uplink physical channel and the uplink physical signal are also collectively referred to as an uplink signal. Furthermore, the downlink physical channel and the uplink physical channel are also collectively referred to as a physical channel. Furthermore, the downlink physical signal and the uplink physical signal are also collectively referred to as a physical signal.

Furthermore, a BCH, a UL-SCH and a DL-SCH are transport channels. A channel that is used in a MAC layer is referred to as a transport channel. Furthermore, a unit of a transport channel that is used in the MAC layer is also referred to as a Transport Block (TB) or a MAC Protocol Data Unit (PDU). The Transport Block is a unit of data that is delivered by the MAC layer to the physical layer. In the physical layer, the Transport Block is mapped to a codeword, and coding processing and the like are performed on every codeword.

The base station apparatus can perform multiple-times beam forming (preceding) on one terminal apparatus. For example, the base station apparatus can perform beam forming (preceding) in the horizontal direction and/or beam forming (preceding) in the vertical direction. Furthermore, for example, regardless of the horizontal direction and the vertical direction, a transmit antenna (an antenna port) can be divided into a plurality of subsets, the beam forming (the precoding) can be performed, with each subset of the antenna port, on one terminal apparatus. For the beam forming, any one of analog beam forming and digital beam forming is possible. The terminal apparatus can report at least one piece of CSI on a plurality of subsets. For the sake of convenience in description, a case will be described below where the base station apparatus performs maximum-two-times beam, forming (precoding) on one terminal apparatus, but the present invention is not limited to this. A case where three- or more-times preceding is performed on one terminal apparatus is also included in the present invention. The terminal apparatus reports on the CSI on subsets of a maximum of two antenna ports, but the CSI on the subset of one antenna port and the CSI on the subset of the other antenna port are also referred to as CSI-1 and is CSI-2, respectively. For example, there is also a case where the CSI-1 indicates the CSI on the beam forming in the horizontal direction and the CSI-2 indicates the CSI on the beam forming in the vertical direction. It is noted that the terminal apparatus may or may not be aware of the subset of each antenna port. For example, the terminal apparatus may or may not be aware of the beam forming in the horizontal direction or the beam forming in the vertical direction. More precisely, the terminal apparatus may obtain the CSI-1, with the expectation that the preceding is the preceding in the horizontal direction, and may obtain the CSI-1, without the expectation that the preceding is the preceding is the horizontal direction. Furthermore, the terminal apparatus may obtain the CSI-2, with the expectation that the preceding is the preceding in the vertical direction, and may obtain the CSI-2, without the expectation that the preceding is the preceding in the vertical direction. It is noted that the CQI, the PMI, the RI, and the PTI that are associated with the CSI-1 are also referred to as CQI-1, PMI-1, RI-1, and PTT-1, respectively. Furthermore, the CQI the PMI, the RI, and the PTI that are associated with the CSI-2 are also referred to as CQI-2, PMI-2, RI-2, and PTI-2, respectively. Furthermore, the CSI-1 or the CSI-2 is also simply referred to as the CSI.

In the case of a configuration in which an alternative code book is enabled for 4 antenna ports (in a case where alternativeCodeBookEnabledFor4TXr12=TRUE is configured), the terminal apparatus reports first PMI and second PMI to the base station apparatus. In the case of 8 antenna ports, the terminal apparatus reports the first PMI and the second PMI to the base station apparatus. It is noted that the first PMI and the second PMI for the CSI-1 are also referred to as first PMI-1 and second PMI-1, respectively. It is noted that the first PMI and the second PMI for the CSI-2 are also referred to as first PMI-2 and second PMI-2, respectively.

The base station apparatus can include a configuration relating to reporting on the CSI-1 and/or CSI-2, in the higher layer signaling. When it comes to the PMI-1 and the MPI-2, the base station apparatus can provide a configuration with the higher layer, in such a manner that PMI values are obtained using the same code book or different code books. The code book that is used for obtaining a PMI-1 value, and the code book that is used for obtaining a PMI-2 value are also referred to as a code book-1 and a code book-2, respectively. With the higher layer, the base station apparatus can configure which of the code book-1 and the code book-2 is used to obtain the PMI value, for the terminal apparatus. A size (the number of bits) of the code book-2 can be made smaller than that of the code book-1. Furthermore, the code book-2 can be set to be a subset of the code book-1. At this time, an amount of feedback information that results from the CSI-1 can be made smaller than an amount of feedback information that results from the CSI-2. Even if a size of the code book-1 and a size of the code book-2 are different from each other, the terminal apparatus may transmit the CSI-1 and the CSI-2 with the same amount of information.

In a case where the base station apparatus provides a configuration in such a manner that the first PMI-1 or the second PMI-1 and the first PMI-2 or the second PMI-2 are reported, the terminal apparatus can obtain the first PMI-2 or the second PMI-2 from the code book of which the size is smaller than that of the code book for the first PMI-1 or the second PMI-1. In this case, the code book that corresponds to the first PMI-2 or the second PMI-2 can be set to be a subset of the code book that corresponds to the first PMI-1 or the second PMI-1.

The base station apparatus can include a configuration (a CSI process) relating to a procedure for calculating the Channel State Information in the higher layer signaling, in a state of being associated with at least CSI-Reference Signal (CSI-RS) for channel measurement and CSI-Interference Measurement (CSI-IM) for interference measurement. A CSI process ID thereof can be included in the CSI process. The base station apparatus can configure one or more CSI processes. The terminal apparatus can generate the CSI independently of every CSI process described above, and can perform feedback (reporting) independently. The base station apparatus can provide a configuration in which a CSI-RS resource and the CSI-IM are different from each other is every CSI process. One or more CSI processes are configured for the terminal apparatus, and the terminal apparatus performs CSI reporting independently for every configured CSI process. Furthermore, the CSI process is configured in a prescribed transmission mode.

In a serving cell, there is a likelihood that an RI reference CSI process will be configured for a certain CSI process in the terminal apparatus in which a prescribed transmission mode in which PMI or RI reporting on the certain CSI process is entailed is configured. In a case where, in the terminal apparatus, the RI reference CSI process is configured for the CSI process, the RI that is reported on the CSI process is the same as the RI that is reported on the configured RI reference CSI process. The RI for the RI reference CSI process is not based on a CSI process for which a process other than the RI reference CSI process is configured. The terminal apparatus does not expect to receive an aperiodic CSI reporting request to a certain subframe that performs the CSI reporting which includes the CSI that is associated with the CSI process and the CSI reporting which does not include the CSI that is associated with the configured RI reference CSI process.

In a case where, in the terminal apparatus, the RI reference CSI process is configured for a certain CSI process and subframe sets $C_{CSI, 0}$ and $C_{CSI, 1}$ are configured, with the higher layer, for only one of the CSI processes, the terminal apparatus does not expect to receive a configuration for the CSI process that is configured with a subframe subset, that has a different set of RI's that are limited as a result of a precoder code book subset limitation between two subframe sets. The terminal apparatus does not expect to receive configurations for the CSI process and the RI reference CSI process that have certain different configurations. The configuration, in which the terminal apparatus does not expect that the CSI process and the RI reference CSI process are different from each other, refers to a set of RI's that are limited with the precoder code book limitation in a ease where the subframe sets $C_{CSI, 0}$ and $C_{CSI, 1}$ are not configured for an aperiodic CSI reporting mode, the number of CSI-RS antenna ports, and/or the CSI process and the RI reference CSI process, a set of RI's that are limited with the precoder code book subset limitation to each subframe set in a case where the subframe sets $C_{CSI, 0}$ and $C_{CSI, 1}$ are configured tor the CSI process and the RI reference CSI process, and/or a set of RI's that are limited with the precoder code book subset limitation in a case where the subframe sets $C_{CSI, 0}$ and $C_{CSI, 1}$ are configured, with the higher layer, for only one of the CSI process and the RI reference CSI process and where sets of RI's that are limited to two subframe sets are the same.

Furthermore, the base station apparatus can configure a plurality of CSI processes for the terminal apparatus, and can associate a prescribed CSI process, among the plurality of CSI processes, with a PMI of a different CSI Process.

In the serving cell, there is a likelihood that a PMI reference CSI process will be configured for a certain CSI process in the terminal apparatus in which a prescribed transmission mode in which the PMI or RI reporting on the certain CSI process is entailed is configured. In a case where, in the terminal apparatus, the PMI reference CSI process is configured for the CSI process, the PMI that is reported on the CSI process is the same as the PMI that is reported on the configured PMI reference CSI process. The PMI for the PMI reference CSI process is not based on a CSI process for which a process other than the PMI reference CSI process is configured. The terminal apparatus does not expect to receive the aperiodic CSI reporting request to a certain subframe that performs the CSI reporting which includes the CSI that is associated with the CSI process and the CSI reporting which does not include the CSI that is associated with the configured PMI reference CSI process.

In a case where, in the terminal apparatus, the PMI reference CSI process is configured for a certain CSI process and the subframe sets $C_{CSI, 0}$ and $C_{CSI, 1}$ are configured, with the higher layer, for only one of the CSI processes, the terminal apparatus does not expect to receive a configuration for the CSI process that is configured with a subframe subset that has a different set of PMI's that are limited as a result of the precoder code book subset limitation between two subframe sets. The terminal apparatus does not expect to receive configurations for the CSI process and the PMI reference CSI process that have certain different configurations. The configuration, in which the terminal apparatus does not expect that the CSI process and the PMI reference CSI process are different from each other, refers to a set of PMI's that are limited with the precoder code book limitation in the case where the subframe sets $C_{CSI, 0}$ and $C_{CSI, 1}$ are not configured for an aperiodic CSI reporting mode, the number of CSI-RS antenna ports, and/or the CSI process and the PMI reference CSI process, a set of PMI's that are limited with the precoder code book subset limitation to each subframe set in a case where the subframe sets $C_{CSI, 0}$ and $C_{CSI, 1}$ are configured for the CSI process and the PMI reference CSI process, and/or a set of PMI's that are limited with the precoder code book subset limitation in a case where the subframe sets $C_{CSI, 0}$ and $C_{CSI, 1}$ are configured, with the higher layer, for only one of the CSI process and the PMI reference CSI process and where sets of PMI's that are limited to two subframe sets are the same.

It is noted that, in the serving cell, there is a likelihood that each of the RI reference CSI process and/or the PMI reference CSI process will be configured independently for a certain CSI process in the terminal apparatus in which a prescribed transmission mode in which the PMI or RI reporting on the certain CSI process is entailed is configured. In such a case, based on the RI reference CSI process and/or the PMI reference CSI process, the terminal apparatus performs the CSI reporting using the method that is described according to the present embodiment.

Furthermore, in the serving cell, there is a likelihood that an RI-PMI reference CSI process will be configured for a certain CSI process in the terminal apparatus in which a prescribed transmission mode in which the PMI or RI reporting on the certain CSI process is entailed is configured. In a case where, in the terminal apparatus, the RI-PMI reference CSI process is configured for the CSI process, the RI and the PMI that are reported on the CSI process are the same as the RI and the PMI that are reported on the configured PMI reference CSI process. The RI and the PMI for the RI-PMI reference CSI process is not based on a CSI process for which a process other than the RI-PMI reference CSI process is configured. The terminal apparatus does not expect to receive the aperiodic CSI reporting request to a certain subframe that performs the CSI reporting which includes the CSI that is associated with the CSI process and the CSI reporting which does not include the CSI that is associated with the configured RI-PMI reference CSI process.

In a case where, in the terminal apparatus, the RI-PMI reference CSI process is configured for a certain CSI process and subframe sets $C_{CSI, 0}$ and $C_{CSI, 1}$ are configured, wife the higher layer, for only one of the CSI processes, the terminal apparatus does not expect to receive a configuration for the CSI process that is configured with a subframe subset that has a different set of RI and PIM that are limited as a result of the precoder code book subset limitation between two subframe sets. The terminal apparatus does not expect to receive configurations for the CSI process and the RI-PMI reference CSI process that have certain different configurations. The configuration, in which the terminal apparatus does not expect that the CSI process and the RI-PMI reference CSI process are different from each other, refers to a set of RI and PMI that are limited with the precoder code book limitation in the case where the subframe sets $C_{CSI, 0}$ and $C_{CSI, 1}$ are not configured for an aperiodic CSI reporting mode, the number of CSI-RS antenna ports, and/or the CSI process and the RI-PMI reference CSI process, a set of RI and PMI that are limited with the precoder code book subset limitation to each subframe set in a case where the subframe sets $C_{CSI, 0}$ and $C_{CSI, 1}$ are configured for the CSI process and the RI-PMI reference CSI process, and/or a set of RI and PMI that are limited with the precoder code book subset limitation in a case where the subframe sets $C_{CSI, 0}$ and $C_{CSI, 1}$ are configured, with the higher layer, for only one of the CSI process and the RI-PMI reference CSI process and where sets of RI and PMI that are limited to two subframe sets are the same.

The base station apparatus can configure the PMI reference CSI process (which hereinafter includes the RI reference CSI process and the RI-PMI reference CSI process as well) for the PMI-1 and/or the PMI-2. Furthermore, the base station apparatus can provide a configuration in such a manner that the terminal apparatus can distinguish between the PMI reference CSI processes for the PMI-1 and the PMI-2. It is noted that the PMI reference CSI process for the PMI-1 is also referred to as a PMI-1 reference CSI process. Furthermore, the PMI reference CSI process for the PMI-2 is also referred to as a PMI-2 reference CSI process. The base station apparatus can configure the CSI process that is different from the PMI-1 reference CSI process and the PMI-2 reference CSI process. More precisely, the base station apparatus can provide a configuration is such a manner feat the PMI-1 reference CSI process ID and the PMI-2 reference CSI process ID are different from each other.

In a case where the PMI reference CSI process is configured, the terminal apparatus can change a code book for obtaining the PMI. For example, in a case where the PMI reference CSI process is configured, the terminal apparatus expects that the configured PMI reference CSI process is the PMI reference CSI process for the PMI-1, and thus can obtain the PMI using a code book-2. For example, in the case where the PMI reference CSI process is configured, the terminal apparatus expects that the configured PMI reference CSI process is the PMI reference CSI process for the PMI-2, and thus can obtain the PMI using a code book-1. Furthermore, for example, in a case where the PMI-1 reference CSI process is configured, the terminal apparatus can obtain the PMI using the code book-2. Furthermore, for example, in a case where the PMI-2 reference CSI process is configured, the terminal apparatus can obtain the PMI using the code book-1.

The base station apparatus can configure the CSI process for reporting the CSI-1 and/or CSI-2. The base station apparatus can provide a configuration in such a manner that the CSI-1 and the CSI-2 are reported with one CSI process. Furthermore, the base station apparatus can configure the CSI process (a CSI process-1) for reporting the CSI-1 and the CSI process (a CSI process-2) for reporting the CSI-2.

In a case where the base station apparatus provides the configuration in such a manner that the CSI-1 and the CSI-2 are reported with one CSI process, the terminal apparatus can calculate the CSI-1 and the CSI-2 in a composite manner. For example, the terminal apparatus selects the PMI-1 and, based on the assumption of the selected PMI-1, can obtain the PMI-2 and the CQI. For example, the terminal apparatus selects the PMI-2 and, on the assumption of the selected PMI-2, can obtain the PMI-1 and obtain the CQI. Furthermore, in the case where the base station apparatus provides the configuration in such a manner that the CSI-1 and the CSI-2 are reported with one CSI process, the terminal apparatus can calculate the CSI-1 and the CSI-2 in an independent manner. At this time, the base station apparatus can provide a configuration in such a manner that CSI-RS configurations for calculating the CSI-1 and the CSI-2 are different from each other.

In a case where the base station apparatus configures the CSI process-1 or CSI process-2, the terminal apparatus reports the CSI (more precisely, the CSI-1 or CSI-2) that corresponds to each CSI process, to the base station apparatus. The base station apparatus can configure a PMI reference CSI process ID with the CSI process-1 or CSI process-2. At this time, the terminal apparatus takes over the PMI value in the CSI process that has the configured PMI reference CSI process ID, and on the assumption of the taken-over PMI, can obtain the CQI. For example, in a case where the PMI reference CSI process ID is configured with the CSI process-2 and the PMI reference CSI process ID indicates the CSI process ID of the CSI process-1, on the assumption of the PMI-1 that is obtained in the CSI process-1, the terminal apparatus can obtain the PMI-2. For example, in a case where the PMI reference CSI process ID is configured with the CSI process-1 and the PMI reference CSI process ID indicates the CSI process ID of the CSI process-2, on the assumption of the PMI-2 that is obtained in the CSI process-2, the terminal apparatus can obtain the PMI-1.

The base station apparatus can configure a CSI process set that includes at least a plurality of CSI processes. The CSI process that is included in the CSI process set is associated with at least PMI. On the assumption of the PMI that is obtained with the CSI process of which a number (for example, a process ID) is small, the terminal apparatus can obtain a CQI or PMI of a different CSI process. For example, in a case where the CSI process-1 and the CSI process-2 are configured as the CSI process set, on the assumption of the PMI that is obtained with the CSI process-1, the terminal apparatus can obtain the CQI or PMI of the CSI process-2. Furthermore, the terminal apparatus selects one PMI taking into consideration a plurality of CSI processes that are included in the CSI process set, and on the assumption of the selected PMI, can obtain the CQI of each CSI process. Furthermore, the terminal apparatus can report the CSI for every CSI process set. Furthermore, the terminal apparatus can associate the RI between the CSI processes that are included in the CSI process set.

The base station apparatus can perform the precoding on the CSI-RS and can transmit the resulting CSI-RS. For example, the base station apparatus can perform the precoding in the vertical direction on the CSI-RS, and can perform the precoding in the horizontal direction and the vertical direction. The base station apparatus can transmit the CSI-RS that goes through the precoding, in each CSI-RS port. For example, CSI-RS ports are arranged in the horizontal direction, and the precoding in the vertical direction is performed in each CSI-RS port. Furthermore, the base station apparatus can also change a precoding pattern for every CSI-RS port, and can also use the same precoding pattern for every CSI-RS port. If the terminal apparatus reports the CQI, the PMI, or the RI, the base station apparatus can know suitable precoding (for example, the precoding pattern in the vertical direction) and suitable precoding (for example, the PMI in the horizontal direction) in the CSI-RS port direction for each CSI-RS port in the terminal apparatus. However, even in a case where the precoding is performed for the CSI-RS port, no limitation to the precoding in the horizontal or vertical direction is imposed.

The base station apparatus can configure one type of CSI-RS configuration for every CSI process, and can change the precoding pattern of the configured CSI-RS. The terminal apparatus reports the CSI to the base station apparatus in every CSI process, but for example, if the precoding pattern that corresponds to the CSI process which has the highest CQI is used for the terminal apparatus, can perform high-quality communication between the base station apparatus itself and the terminal apparatus and can improve throughput. In this case, the terminal apparatus does not need to be aware of whether or not the precoding is performed on the CSI-RS.

Generally, if there are many precoding patterns, a highly accurate precoding pattern can be selected. Therefore, in a case where the precoding is performed on the CSI-RS, it is desirable that the number of configurable CSI processes is great. The base station apparatus can increase the number of configuration CSI processes in a case where the precoding is performed on the CSI-RS rather than in a case where the precoding is not performed on the CSI-RS. In this case, the terminal apparatus can report only one or several of the plurality of configured CSI processes to the base station apparatus. When it comes to the number of CSI processes that is reported by the terminal apparatus, one or more CSI processes may be decided in advance, and the number of CSI processes that is reported by the terminal apparatus can also be configured by the base station apparatus.

The base station apparatus can change the precoding pattern of the CSI-RS in every subband. For example, the base station apparatus configures a mode in which a narrowband CQI, and the terminal apparatus reports the CQI in every subband in the system band, the CQI value that is selected by the terminal apparatus and a location (information indicating the selected subband) of the terminal apparatus, to the base station apparatus. With the CSI that is reported from the terminal apparatus, the base station apparatus can determine which precoding pattern is excellent.

The base station apparatus can change the precoding pattern that is applied to the CSI-RS in every subframe and in every subband. Furthermore, the base station apparatus can transmit the CSI-RS in a specific subframe, without performing the precoding on the CSI-RS. The base station apparatus can provide signaling of information relating to the CSI-RS that is transmitted without going through the precoding, to the terminal apparatus, in a state of being associated with the CSI process or the like. Based on the CSI-RS that is transmitted without going through the precoding and the CSI-RS that is transmitted without going through the precoding, the terminal apparatus reports the CSI to the base station apparatus in every subband. The base station apparatus can determine which precoding pattern is excellent, based on a difference between the CQI in every subband, which is reported by the terminal apparatus based on the CSI-RS that goes through the precoding and is transmitted, and the CQI in every subband, which is reported by the terminal apparatus based on the CSI-RS that is transmitted without going through the precoding. Furthermore, when the CQI in every subband to the base station apparatus is reported based on the CSI-RS that goes through the precoding and is transmitted, the terminal apparatus can report a value of a difference (a difference CQI value) with the CQI in every subband, which is reported to the base station apparatus based on the CSI-RS that is transmitted without going through the precoding, or is reported as the CSI process. With the difference CQI value that is reported by the terminal apparatus, the base station apparatus can determine which precoding pattern is excellent. The terminal apparatus may further report a wide-band CQI to the base station apparatus.

In a case where the base station apparatus changes the precoding pattern of the CSI-RS in every subband, the terminal apparatus obtains the CSI in the subband, using only the CSI-RS that is mapped to the subband. That is, in a case where the CSI in the subband is obtained, the terminal apparatus does not use the CSI-RS that is mapped to other than the subband. For example, in a case where a mode of the CSI reporting on a subband is configured and a prescribed mode and/or a transmission mode relating to the CSI-RS is configured, the terminal apparatus obtains the CSI in the subband using only the CSI-RS that is mapped to the subband. In other words, the terminal apparatus does not assume that the CSI-RS that is mapped to the subband and the CSI-RS that is mapped to other than the subband are in the same channel (have channel performance, or are in the same channel state). In other words, the terminal apparatus assumes that the CSI-RS that is mapped to the subband and the CSI-RS that is mapped to other than the subband are in different channels (have different channel performance, or are in different channel states). In other words, the terminal apparatus assumes that only the CSI-RS that is mapped to at least the subband is in the same channel (has the same channel performance, or is in the same channel state).

The base station apparatus can configure a mode in which the reporting of only the narrowband CQI or PMI is requested. The base station apparatus can configure a mode in which the reporting of the narrowband CQI or PMI is requested in a Secondary Cell (SCell). More precisely the terminal apparatus can report a broadband CQI or tire narrowband CQI for a PCell, and can report the narrowband CQI for the SCell.

The base station apparatus can configure a mode in which the reporting of the narrowband CQI in subband feedback (Higher Layer-configured subband feedback) that is configured by the higher layer on the PUSCH is requested. In this case, the terminal apparatus, for example, reports the narrowband CQI in every subband of the system band. Even when RI>1, the narrowband CQI indicates channel quality for a first codeword. Furthermore, in this case, when it comes to the narrowband CQI value, the terminal apparatus can report an index. Furthermore, the terminal apparatus can assume an index of the narrowband CQI value in a subband that is a reference, and can also assume the difference CQI value in a different subband. When calculating the CQI value, the terminal apparatus can set a rank 1 as a condition.

The base station apparatus can configure a mode in which the reporting of the narrowband CQI and a plurality of PMI's in the subband feedback that is configured by the higher layer on the PUSCH is requested. For example, in a case where 8 CSI-RS ports are configured in a prescribed transmission mode, or in a case where a configuration in which an alternative code book is enabled for 4 ports (alternativeCodeBookEnabledFor4TX=TRUE) is provided, the terminal apparatus reports the first PMI for the system band and the second PMI for each subband of the system band. In the other cases, the terminal apparatus reports one PMI in every subband of the system band. The terminal apparatus reports one narrowband CQI for every codeword in every subband of the system band. The terminal apparatus can also set the narrowband CQI value as an index of the CQI and can assume the index of the narrowband CQI value in a subband that is a reference, and can assume the difference CQI value in a different subband. The terminal apparatus calculates the narrowband CQI using the PMI that is selected in each subband. When calculating the PMI or CQI value, the terminal apparatus can also set the reported RI as a condition, and can also set the rank 1 as a condition.

The base station apparatus can configure a mode in which the reporting of the narrowband CQI in feedback (UE-selected subband feedback) that is selected by the terminal apparatus on the PUSCH is requested. In this case, the terminal apparatus, for example, selects M suitable subbands, each of which has a size k, from among the subbands of the system band, and reports one CQI value that reflects transfer in the selected M subbands. The terminal apparatus can set the narrowband CQI value as the index of the CQI. It is noted that M and k are given for the system bandwidth. Furthermore, in the case of a mode in which only the narrowband CQI is reported, the terminal apparatus performs comparison with a mode in which only the broadband CQI is reported, and thus report the CQI, taking into consideration the M that is a small value. Furthermore, in the case of the mode in which only the narrowband CQI is reported, the terminal apparatus can also assume that M=1, without depending on the system bandwidth. Furthermore, the terminal apparatus reports positions of the selected M subbands. When calculating the CQI value, the terminal apparatus can set the rank 1 as a condition.

The base station apparatus can configure a mode in which the reporting of the narrowband CQI and a plurality of PMI's in the feedback that is selected by the terminal apparatus on the PUSCH is requested. In this case, the terminal apparatus, for example, selects M suitable subbands, each of which has a size k, from among the subbands of the system band, and selects one suitable PMI, from the code book set that is suitable for use in the selected M subbands. The terminal apparatus reflects transfer in only the selected M suitable subbands, and reports one CQI for every codeword, using the same PMI that is selected. The terminal apparatus can set the CQI value that is reported, as the index of the CQI. Furthermore, the terminal apparatus reports the positions of the selected M subbands. Except for the case where 8 CSI-RS ports are configured in a prescribed transmission mode, or the case where the configuration in which an alternative code book is enabled for 4 ports (alternativeCodeBookEnabledFor4TX=TRUE) is provided, the terminal apparatus reports one suitable PMI for the selected M subbands and one PMI that is selected from all subbands in the system band. In the case where 8 CSI-RS ports are configured in a prescribed transmission mode, or in the case where the configuration in which an alternative code book is enabled for 4 ports (alternativeCodeBookEnabledFor4TX=TRUE) is provided, the terminal apparatus reports the first PMI for all subbands of the system band. In this case, the terminal apparatus further reports the second PMI for all subbands of the system band and an alternative second PMI for the selected M subbands. One PMI is selected from the code book subset that assumes the transfer in the subband of the system band. When calculating the PMI or CQI value, the terminal apparatus can also set the reported RI as a condition, and can also set the rank 1 as a condition.

The base station apparatus can configure a mode in which the reporting of the narrowband CQI in the feedback that is selected by the terminal apparatus on the PUCCH is requested. The terminal apparatus, for example, selects a suitable subband from a set of Nj subbands in each of J bandwidth parts and performs type 1 reporting. J is decided by a bandwidth, and Nj is obtained from the number of resource block counts, a subband size, and J. The type 1 reporting refers to reporting of one CQI value that reflects transfer in a subband that is selected along with a corresponding L-bit label, from the bandwidth part. The type 1 reporting for each bandwidth part is performed sequentially at the opportunity for successive reporting. Even when RI>1, the CQI indicates the channel quality for the first codeword.

The base station apparatus can configure a mode in which the reporting of the narrowband CQI and the PMI in the feedback that is selected by the terminal apparatus on the PUCCH is requested. The terminal apparatus selects the PMI for all subbands of the system band, and sequentially reports the CQI in a suitable subband for each bandwidth part, which is obtained on the assumption of the selected PMI, at the opportunity for the successive reporting. In a case where a configuration in which an alternative code book is enabled with 2 CSI-RS ports and 4CSI-RS ports (alternativeCodeBookEnabledFor4TX=TRUE) is not provided for a prescribed transmission mode, if the PMI reference CSI process is configured for the CSI process in a subframe that is reported by the PMI, the PMI for the CSI process is the same PMI as the PMI in the CSI reporting that includes the latest PMI for the PMI reference CSI process drat is configured regardless of the subframe set. In a case where the PMI reference CSI process is not configured, the terminal apparatus decides the PMI on the assumption of the transfer in the subband of the system band. In a case where a configuration in which an alternative code book is enabled with 8 CSI-RS ports or 4CSI-RS ports (alternativeCodeBookEnabledFor4TX=TRUE) is provided for a prescribed transmission mode, if the PMI reference CSI process is configured for the CSI process in the subframe that is reported by the PMI, the PMI for the CSI process is the same PMI as the PMI in the CSI reporting that includes the latest PMI for the PMI reference CSI process that is configured regardless of the subframe set. In the case where the PMI reference CSI process is not configured, the terminal apparatus decides the PMI on the assumption of the transfer in the subband of the system band.

The base station apparatus can configure a plurality of types of CSI-RS configurations with one CSI process. The base station apparatus can change the precoding pattern for every CSI-RS configuration. In this case, the terminal apparatus selects the CSI-RS configuration that has excellent channel quality, and reports information that is based on the selected CSI-RS configuration, to the base station apparatus. In this case, with the information that is based on the CSI-RS configuration which is reported from the terminal apparatus, the base station apparatus can know a suitable preceding pattern for the terminal apparatus. The terminal apparatus can report the information that is based on one of, several of, or all of the CSI-RS configurations, among a plurality of types of CSI-RS configurations that are configured. It is noted that the number of CSI-RS configurations that are reported may be decided in advance and signaling of the number of CSI-RS configurations may be provided with the higher layer.

A case will be described in detail below where a plurality of types of CSI-RS configurations are configured for one CSI process and where the information that is based on the CSI-RS configuration is reported as the CSI. At this point, the CSI-RS configuration is information relating to mapping of the CSI-RS to a resource element. For example, the CSI-RS configuration includes pieces of information that are a periodicity indicating a subframe to which the CSI-RS is mapped (in which the CSI-RS is transmitted), and an offset. Furthermore, the CSI-RS configuration includes information indicating a resource element to which the CSI-RS is mapped in a subframe to which the CSI-RS is mapped (in which the CSI-RS is transmitted).

The number of antenna parts in the case where the information which is based on the CSI-RS configuration is reported as the CSI is any one of 1, 2, 4, and 8, or any one of several of 1, 2, 4, and 8. For example, the number of antenna ports for the CSI-RS in the case where the information which is based on the CSI-RS configuration may be only 1. That is, when it comes to the CSI-RS that is indicated by each of the CSI-RS configurations is performed, each of the prescribed-precoding operations is independently in the base station apparatus, the terminal apparatus selects and reports a suitable CSI-RS from a plurality of types of CSI-RS configurations that are configured, and thus the base station apparatus can estimate suitable preceding processing in the terminal apparatus.

The information that is based on the CSI-RS configuration can be set as an index indicating the CSI-RS configuration that is specified in advance. Furthermore, the information that is based on the CSI-RS configuration can be set as an index that is configured sequentially for the CSI-RS configuration that is configured.

In a case where the information that is based on the CSI-RS configuration is reported as the CSI, the CSI includes at least the information that is based on the CSI-RS configuration and a CQI that is decided based on the CSI-RS that is indicated by the CSI-RS configuration. That is, a CQI in a case where it is assumed that transmission is performed with the CSI-RS that is indicated by the CSI-RS configuration is generated and is reported.

The information that is based on the CSI-RS configuration may be reported using a resource (a field, a channel, a subframe, regardless of a resource block) for reporting the PMI the RI, and/or the PTI. Furthermore, the information that is based on the CSI-RS configuration may go through joint coding along with the PMI, the RI and/or the PTI, and may be generated as one piece of CSI.

The information that is based on the CSI-RS configuration can be reported only in the case of a prescribed CSI reporting mode and/or a prescribed transmission mode.

In a case where a plurality of CSI-RS antenna ports are used, the base station apparatus can apply a different precoding pattern to the CSI-RS that is transmitted by each CSI-RS antenna port. The terminal apparatus can report the CQI for each CSI-RS antenna port to each of the base station apparatuses. For example, in a case where a configuration is provided in such a manner that the CSI is fed back for every codeword, the terminal apparatus can report a CQI of a CSI-RS antenna port 1 as a CQI of a codeword 1 to the base station apparatus, and can report a CQI of a CSI-RS antenna port 2 as a CQI of a codeword 2 to the base station apparatus. With the CQI that is reported as the CQI of each codeword by the terminal apparatus, the base station apparatus can know a suitable precoding pattern for the terminal apparatus. Furthermore, a terminal apparatus 1 can report the CQI of the CSI-RS antenna port that has the most excellent quality, as the CQI of the codeword 1 to the base station apparatus, and can report a port number of the CSI-RS antenna port as the CQI of the codeword 2 to the base station apparatus. With the CQI and the antenna port number that are reported by the terminal apparatus, the base station apparatus can know a suitable precoding pattern for the terminal apparatus. It is noted that, when it comes to a reference by which the terminal apparatus obtains the difference CQI value in every subband, a subband CQI or a wide-band CQI, which are obtained based on the CSI-RS that is transmitted without going through the preceding described above, can be set to be a reference, and a subband CQI or a wide-band CQI that is obtained based on the RS (for example, the CRS) that is transmitted without going through different precoding can be set to a reference.

The base station apparatus can apply a different preceding pattern to each receive antenna of the terminal apparatus. The terminal apparatus can report the CQI in each receive antenna and/or an index of the receive antenna to each of the base station apparatuses. With the CQI and/or the index of the receive antenna that is reported by the terminal apparatus, the base station apparatus can know a suitable preceding pattern for the terminal apparatus. It is noted that, when it comes to a reference by which the terminal apparatus obtains the difference CQI value in every subband, a subband CQI or a wide-band CQI, which are obtained based on the CSI-RS that is transmitted without going through the preceding described above, can be set to be a reference, and a subband CQI or a wide-band CQI that is obtained based on the RS (for example, the CRS) that is transmitted without going through different preceding can be set to a reference.

Furthermore, by using a directional antenna or adjusting an antenna tilting angle, the base station apparatus can realize a flexible sector.

Figure 2:
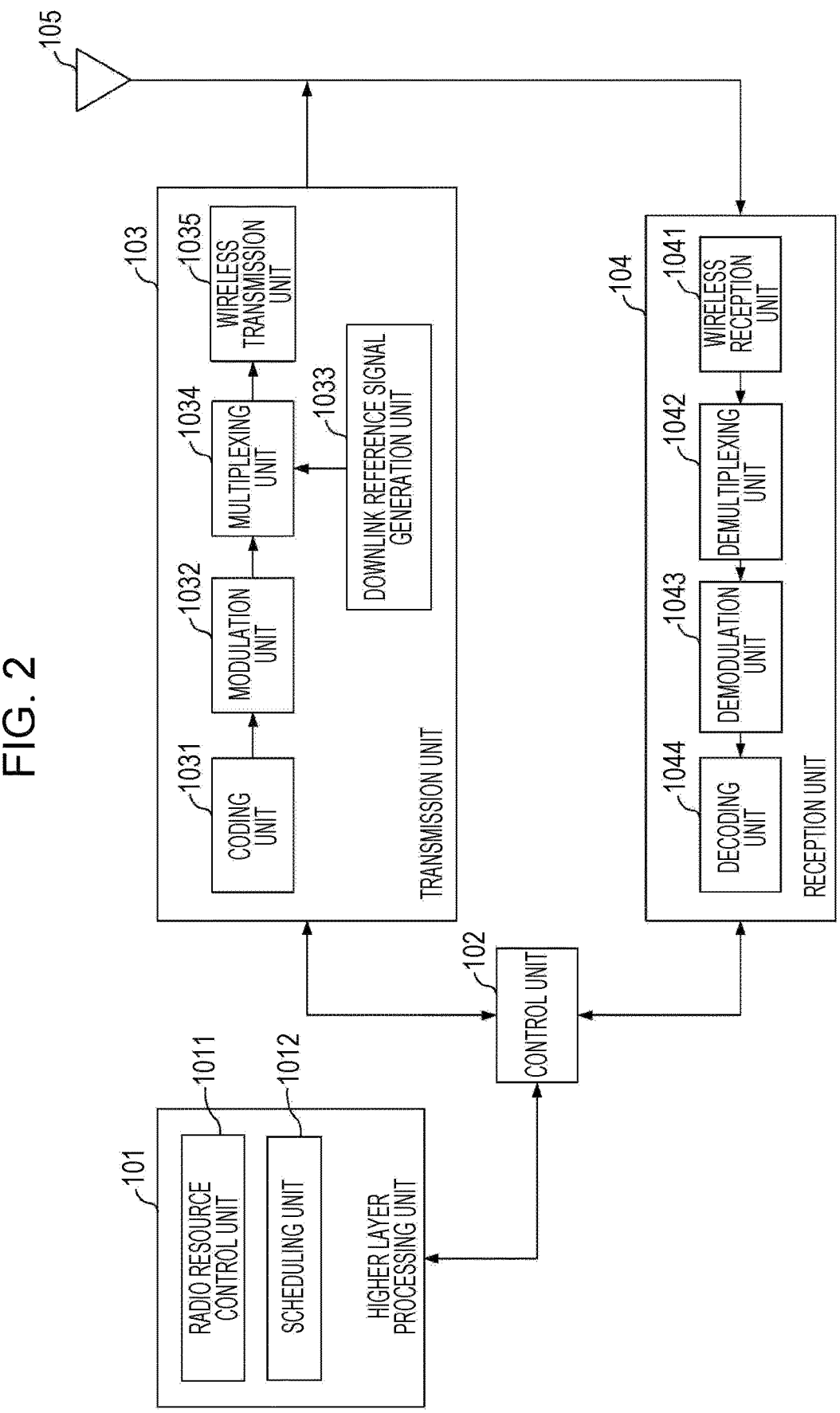
FIG. 2 is a block diagram illustrating an example of a constitution of a base station apparatus according to the present embodiment.

FIG. 2 is a schematic block diagram illustrating a constitution of the base station apparatus 1A according to the present invention. As illustrated in FIG. 2, the base station apparatus 1A is constituted to include a higher layer processing unit (a higher layer processing step) 101, a control unit (a control step) 102, a transmission unit (a transmission step) 103, a reception unit (a reception step) 104, and a transmit and receive antenna 105. Furthermore, the higher layer processing unit 101 is constituted to include a radio resource control unit (a radio resource control step) 1011 and a scheduling unit (a scheduling step) 1012. Furthermore, the transmission unit 103 is constituted to include a coding unit (a coding step) 1031, a modulation unit (a modulation step) 1032, a downlink reference signal generation unit (a downlink reference signal generation step) 1033, a multiplexing unit (a multiplexing step) 1034, and a wireless transmission unit (a wireless transmission step) 1035. Furthermore, the reception unit 104 is constituted to include a wireless reception unit (a wireless reception step) 1041, a demultiplexing unit (a demultiplexing step) 1042, a demodulation unit (a demodulation step) 1043, and a decoding unit (a decoding step) 1044.

The higher layer processing unit 101 performs processing of the Medium Access Control (MAC) layer, a Packet Data Convergence Protocol (PDCP) layer, a Radio Link Control (RLC) layer, and the Radio Resource Control (RRC) layer. Furthermore, the higher layer processing unit 101 generates information indispensable to perform control of the transmission unit 103 and the reception unit 104, and outputs the generated information to the control unit 102.

The higher layer processing unit 101 receives information relating to the terminal apparatus, such as a function (UE capability) of the terminal apparatus, from the terminal apparatus. In other words, the terminal apparatus transmits a function of the terminal apparatus's own to the base station apparatus with the higher layer signal.

It is noted that, as will be described below, pieces of information relating to the terminal apparatus include information indicating whether or not the terminal apparatus supports a prescribed function, and information indicating completion of an introduction of a test of the prescribed function by the terminal apparatus. It is noted that, as will be described below, whether or not the prescribed function is supported includes whether or not the introduction and the test of the prescribed function is completed.

For example, in a case where the terminal apparatus supports the prescribed function, the terminal apparatus transmits information (a parameter) indicating whether or not the prescribed function is supported. In a case where the terminal apparatus does not support the prescribed function, the terminal apparatus does not transmit the information (the parameter) indicating whether or not the prescribed function is supported. That is, whether or not the prescribed function is supported is notified depending on whether or not the information (the parameter) indicating whether or not the prescribed function is supported is transmitted. It is noted that the information (the parameter) indicating whether or not the prescribed function is supported may be notified using one bit, that is, 0 or 1.

The radio resource control unit 1011 generates or acquires from a higher node the downlink data (the Transport Block) that is mapped to the PDSCH for the downlink, the system information, the RRC message, the MAC CE, and the like. The radio resource control unit 1011 outputs the downlink data to the transmission unit 103, and outputs other pieces of information to the control unit 102. Furthermore, the radio resource control unit 1011 manages various pieces of configuration information of the terminal apparatus.

The scheduling unit 1012 determines a frequency and a subframe to which the physical channels (the PDSCH and PUSCH) are allocated, a code rate and a modulation scheme (or the MCS) of and for the physical channels (the PDSCH and the PUSCH), transmit power, and the like. The scheduling unit 1012 outputs pieces of information that are decided, to the control unit 102.

The scheduling unit 1012 generates information that is used for scheduling of the physical channels (the PDSCH and the PUSCH), based on a result of the scheduling. The scheduling unit 1012 outputs the generated information to the control unit 102.

Based on information that is input from the higher layer processing unit 101, the control unit 102 generates a control signal for performing control of the transmission unit 103 and the reception unit 104. The control unit 102 generates the Downlink Control Information, based on the information that is input from the higher layer processing unit 101, and outputs the generated Downlink Control Information to the transmission unit 103.

The transmission unit 103 generates the Downlink Reference Signal in accordance with the control signal that is input from the control unit 102, codes and modulates the HARQ indicator, the Downlink Control Information, and the downlink data, which are input from the higher layer processing unit 101, multiplexes the PHICH, the PDCCH, the EPDCCH, the PDSCH, and the Downlink Reference Signal, and transmits the resulting signal to the terminal apparatus 2 through the transmit and receive antenna unit 105.

The coding unit 1031 performs coding on the HARQ indicator, the Downlink Control Information, and the downlink data, which are input from the higher layer processing unit 101. When performing the coding, the coding unit 1031 uses a coding scheme that is decided in advance, such as block coding, convolutional coding, or turbo coding, or uses a coding scheme that is decided by the radio resource control unit 1011. The modulation unit 1032 performs modulation on coded bits that are input from the coding unit 1031, using a modulation scheme that is decided in advance, such as Binary Phase Shift Keying (BPSK), quadrature Phase Shift Keying (QPSK), 16 quadrature amplitude modulation (QAM), 64 QAM, or 256 QAM, or using a modulation scheme that is decided by the radio resource control unit 1011.

The downlink reference signal generation unit 1033 generates as the Downlink Reference Signal a sequence that is already known to the terminal apparatus 2A, which is obtained according to a rule that is decided in advance based on a physical cell identity (PCI) (a cell ID) for identifying the base station apparatus 1A, and the like.

The multiplexing unit 1034 multiplexes a modulation symbol of each channel, which results from the modulation, and the Downlink Reference Signal and the Downlink Control Information, which are generated. More precisely, the multiplexing unit 1034 maps the modulation symbol of each channel, which results from the modulation, and the Downlink Reference Signal and the Downlink Control Information, which are generated, to resource elements.

The wireless transmission unit 1035 performs Inverse Fast Fourier Transform (IFFT) on a modulation symbol and the like that result from the multiplexing, generates an OFDM symbol, attaches a cyclic prefix (CP) to the OFDM symbol, generates a digital signal in a baseband, converts the digital signal in the baseband into an analog signal, removes a superfluous frequency component by performing filtering, performs up-converting into a carrier frequency, performs power amplification, and outputs a final result to the transmit and receive antenna unit 105 for transmission.

In accordance with the control signal that is input from the control unit 102, the reception unit 104 outputs information, which results from demultiplexing, demodulating, and decoding a reception signal that is received from the terminal apparatus 2A through the transmit and receive antenna 105, to the higher layer processing unit 101.

The wireless reception unit 1041 converts an uplink signal that is received through the transmit and receive antenna 105, into a signal in a base band by performing down-convert, removes a unnecessary frequency component, controls an amplification level in such a manner that a signal level is suitably maintained, performs orthogonal demodulation based on an in-phase component and an orthogonal component of the received signal, and converts an analog signal that results from the orthogonal demodulation, into a digital signal.

The wireless reception unit 1041 removes a portion that is equivalent to the CP from the digital signal that results from the conversion. The wireless reception unit 1041 performs Fast Fourier Transform (FFT) on the signal from which the CP is removed, extracts a signal in the frequency domain, and outputs the extracted signal to the demultiplexing unit 1042.

The demultiplexing unit 1042 demultiplexes the signal that is input from the wireless reception unit 1041 into the PUCCH, the PUSCH, and the signal such as the Uplink Reference Signal. It is noted that, the demultiplexing is performed based on radio resource allocation information that is decided in advance by the base station apparatus 1A, using the radio resource control unit 1011, and that is included in the uplink grant that is notified to each terminal apparatus 2.

Furthermore, the demultiplexing unit 1042 performs channel compensation on the PUCCH and the PUSCH. Furthermore, the demultiplexing unit 1042 demultiplexes the Uplink Reference Signal.

The demodulation unit 1043 performs Inverse Discrete Fourier Transform (IDFT) on the PUSCH, acquires the modulation symbol, and performs reception signal demodulation on each of the modulation symbols on the PUCCH and the PUSCH, using the modulation scheme that is decided in advance, such as BPSK, QPSK, 16 QAM, 64 QAM, or 256 QAM, or using the modulation scheme that is notified, in advance, with the uplink grant, to each terminal apparatus 2 by the base station apparatus 1A itself.

The decoding unit 1044 performs the decoding on coded bits of the PUCCH and the PUSCH that result from the demodulation, at a code rate in compliance with the coding scheme that is decided in advance, which is decided in advance, or at a code rate which is notified in advance with the uplink grant to the terminal apparatus 2 by the base station apparatus 1A itself, and outputs the uplink data and the Uplink Control Information that result from the decoding, to the higher layer processing unit 101. In the case of re-transmission of the PUSCH, the decoding unit 1044 performs the decoding using the coded bits that are input from the higher layer processing unit 101 and that are retained in an HARQ buffer, and the coded bits that result from the demodulation.

Figure 3:
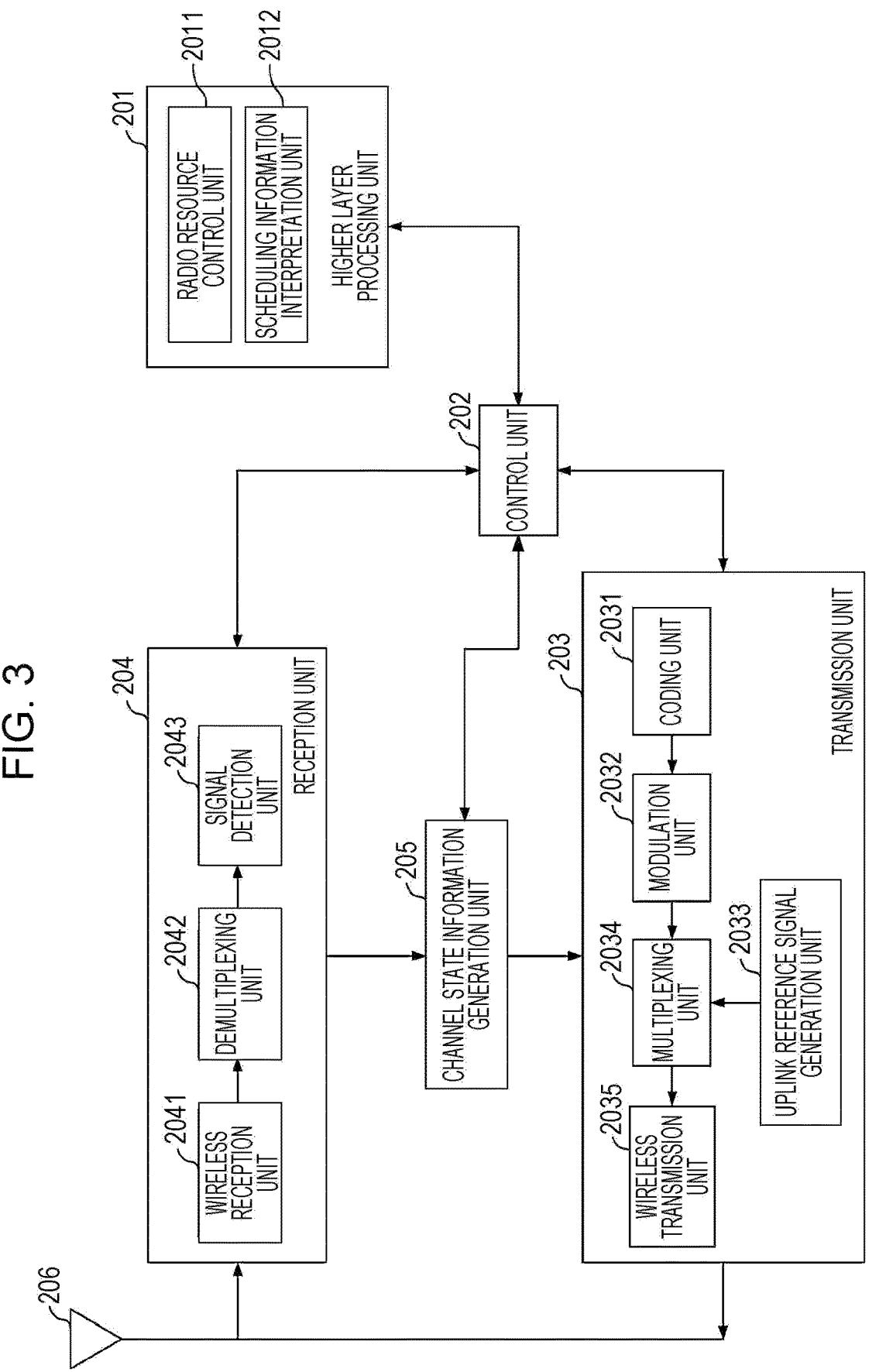
FIG. 3 is a block diagram illustrating an example of a constitution of a terminal apparatus according to the present embodiment.

FIG. 3 is a schematic block diagram illustrating a constitution of the terminal apparatus 2 according to the present invention. As illustrated in FIG. 3, the terminal apparatus 2A is constituted to include a higher layer processing unit (a higher layer processing step) 201, a control unit (a control step) 202, a transmission unit (a transmission step) 203, a reception unit (a reception step) 204, a channel state information generation unit (a channel state information generation step) 205, and a transmit and receive antenna 206. Furthermore, the higher layer processing unit 201 is constituted to include a radio resource control unit (a radio resource control step) 2011 and a scheduling information interpretation unit (a scheduling information interpretation step) 2012. Furthermore, the transmission unit 203 is constituted to include a coding unit (a coding step) 2031, a modulation unit (a modulation step) 2032, an uplink reference signal generation unit (an uplink reference signal generation step) 2033, a multiplexing unit (a multiplexing step) 2034, and a wireless transmission unit (a wireless transmission step) 2035. Furthermore, the reception unit 204 is constituted to include a wireless reception unit (a wireless reception step) 2041, a demultiplexing unit (a demultiplexing step) 2042, and a signal detection unit (a signal detection step) 2043.

The higher layer processing unit 201 outputs the uplink data (the Transport Block) drat is generated by a user operation and the like, to the transmission unit 203. Furthermore, the higher layer processing unit 201 performs the processing of the Medium Access Control (MAC) layer, the Packet Data Convergence Protocol (PDCP) layer, the Radio Link Control (RLC) layer, and the Radio Resource Control (RRC) layer.

The higher layer processing unit 201 outputs information indicating the function of the terminal apparatus, which is supported by the terminal apparatus itself, to the transmission unit 203.

The radio resource control unit 2011 manages various pieces of configuration information of the terminal apparatus itself. Furthermore, the radio resource control unit 2011 generates information that is mapped to each channel in the uplink, and outputs the generated information to the transmission unit 203.

The radio resource control unit 2011 acquires configuration information relating to CSI feedback, which is transmitted from the base station apparatus, and outputs the acquired configuration information to the control unit 202.

The scheduling information interpretation unit 2012 interprets the Downlink Control Information that is received through the reception unit 204 and determines scheduling information. Furthermore, the scheduling information interpretation unit 2012 generates control information in order to perform control of the reception unit 204 and the transmission unit 203 based on the scheduling information, and outputs the generated control information to the control unit 202.

Based on the information that is input from the higher layer processing unit 201, the control unit 202 generates a control signal for performing the control of the reception unit 204, the channel state information generation unit 205, and the transmission unit 203. The control unit 202 outputs the generated control signal to the reception unit 204, the channel state information generation unit 205, and the transmission unit 203 and performs the control of the reception unit 204 and the transmission unit 203.

The control unit 202 controls the transmission unit 203 in such a manner that the channel state information generation unit 205 transmits the generated CSI to the base station apparatus.

In accordance with a control signal that is input from the control unit 202, the reception unit 204 demultiplexes, demodulates, and decodes a reception signal that is received from the base station apparatus 1A through the transmit and receive antenna 206, and outputs the resulting information to the higher layer processing unit 201.

The wireless reception unit 2041 converts a downlink signal that is received through the transmit and receive antenna 206, into a signal in a base band by performing down-convert, removes a unnecessary frequency component, controls an amplification level in such a manner that a signal level is suitably maintained, performs orthogonal demodulation based on an in-phase component and an orthogonal component of the received signal, and converts an analog signal that results from the orthogonal demodulation, into a digital signal.

Furthermore, the wireless reception unit 2041 removes a portion that is equivalent to the CP from the digital signal that results from the conversion, performs Fast Fourier Transform on the signal from which the CP is removed, and extracts a signal in the frequency domain.

The demultiplexing unit 2042 demultiplexes a signal that results from the extraction, into the PHICH, the PDCCH, the EPDCCH, the PDSCH, and the Downlink Reference Signal. Furthermore, the demultiplexing unit 2042 performs channel compensation on the PHICH, the PDCCH, and the EPDCCH based on a channel estimate of a desired signal that is acquired from channel measurement, detects the Downlink Control Information, and outputs the detected Downlink Control Information to the control unit 202. Furthermore, the control unit 202 outputs the PDSCH and the channel estimate of the desired signal to the signal detection unit 2043.

The signal detection unit 2043 performs the signal detection using the PDSCH and the channel estimate, and outputs a result of the signal detection to the higher layer processing unit 201.

The transmission unit 203 generates the Uplink Reference Signal in accordance with the control signal, which is input from the control unit 202, performs the coding and the modulation on the uplink data (the Transport Block), which is input from the higher layer processing unit 201, multiplexes the PUCCH, the PUSCH, and the generated Uplink Reference Signal, and transmits a result of the multiplexing to the base station apparatus 1A through the transmit and receive antenna 206.

The coding unit 2031 performs the coding, such as the convolutional coding or the block coding, on the Uplink Control Information that is input from the higher layer processing unit 201. Furthermore, the coding unit 2031 performs the turbo coding, based on information that is used for scheduling of the PUSCH.

The modulation unit 2032 performs the modulation on coded bits, which are input from the coding unit 2031, in compliance with a modulation scheme that is notified with the Downlink Control Information, such as BPSK, QPSK, 16 QAM, or 64 QAM, or in compliance with a modulation scheme that is decided in advance for every channel.

The uplink reference signal generation unit 2033 generates a sequence that is obtained according to a rule (formula) which is decided in advance, based on a physical cell identity (which is also referred to as a PCI or a Cell ID) for identifying the base station apparatus 1A, a bandwidth to which the Uplink Reference Signal is mapped, a cyclic shift that is notified with the uplink grant, a parameter value for generation of a DMRS sequence, and the like.

In accordance with the control signal that is input from the control unit 202, the multiplexing unit 2034 re-maps the modulation symbols on the PUSCH in parallel and then performs Discrete Fourier Transform (DFT) on the resulting modulation symbols. Furthermore, the multiplexing unit 2034 multiplexes PUCCH and PUSCH signals and the generated Uplink Reference Signal for every transmit antenna port. More precisely, the multiplexing unit 2034 maps the PUCCH and PUSCH signals and the generated Uplink Reference Signal to resource elements for every transmit antenna port.

The wireless transmission unit 2035 performs Inverse Fast Fourier Transform (IFFT) on a signal that results from the multiplexing, performs modulation in compliance with an SC-FDMA scheme on the resulting signal, generates an SC-FDMA symbol, attaches a CP to the generated SC-FDMA symbol, generates a digital signal in a base band, converts the digital signal in the base band into an analog signal, removes superfluous frequency components, performs up-convert into a earner frequency, performs power amplification, and transmits a final result to the transmit and receive antenna 206 for transmission.

A program running on tire base station apparatus and the terminal apparatus according to the present invention is a program (a program for causing a computer to perform functions) that controls a CPU and the like in such a manner as to realize the functions according to the embodiments of the present invention, which are described above. Then, pieces of information that are handled in the apparatus and the device are temporarily stored in a RAM while being processed. Thereafter, the pieces of information are stored in various ROM's or HDD's, and if need arises, is read by the CPU to be modified or written. Of a semiconductor medium (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible as a recording medium on which to store the program. Furthermore, in some cases, the functions according to the embodiments, which are described above, are realized by executing the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transferred to a server computer that is connected through a network such as the Internet. In this case, a storage device of the server computer also falls within the scope of the present invention. Furthermore, some or all of the portions of each of the terminal apparatus and the base station apparatus according to the embodiments, which are described above, may be realized as an LSI that is a typical integrated circuit. Each functional block of a reception device may be individually built into a chip, and one or several of, or all of the functional blocks may be integrated into a chip. In a case where each of the functional blocks is integrated into a circuit, an integrated circuit control unit is added that controls the functional blocks.

Furthermore, a technique for the integrated circuit is not limited to the LSI, and an integrated circuit for the functional block may be realized as a dedicated circuit or a general-purpose processor. Furthermore, if, with advances in semiconductor technology, a circuit integration technology for a circuit with which an LSI is replaced will appear, it is also possible that an integrated circuit to which such a technology applies is used.

It is noted that the invention in the present application, is not limited to the embodiments described above. Furthermore, application of the terminal apparatus according to the invention in the present application is not limited to a mobile station apparatus. It goes without saying that the terminal apparatus can be applied to a stationary-type electronic apparatus that is installed indoors or outdoors, or a non-movable-type electronic apparatus, for example, an AV apparatus, a kitchen apparatus, a cleaning or washing machine, an air conditioner, office equipment, a vending machine, and other household apparatuses.

The embodiments of the present invention are described in detail above with reference to the drawings, but specific configurations are not limited to the embodiments. A design and the like within the scope not departing from the gist of the present invention also fall within the scope of the claims.

INDUSTRIAL APPLICABILITY

The present invention is suitable for use in a base station apparatus, a terminal apparatus, and a communication method.

The present international application claims the benefit of priority based on Japanese Patent Application No. 2014-225690 filed on Nov. 6, 2014. The entire contents of Japanese Patent Application No. 2014-225690 are incorporated in the present international application.

REFERENCE SIGNS LIST 1A, 1B BASE STATION APPARATUS
2A, 2B, 2C TERMINAL APPARATUS
101 HIGHER LAYER PROCESSING UNIT
102 CONTROL UNIT
103 TRANSMISSION UNIT
104 RECEPTION UNIT
105 TRANSMIT AND RECEIVE ANTENNA
1011 RADIO RESOURCE CONTROL UNIT
1012 SCHEDULING UNIT
1031 CODING UNIT
1032 MODULATION UNIT
1033 DOWNLINK REFERENCE SIGNAL GENERATION UNIT
1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATION UNIT
206 TRANSMIT AND RECEIVE ANTENNA
2011 RADIO RESOURCE CONTROL UNIT
2012 SCHEDULING INFORMATION INTERPRETATION UNIT
2031 CODING UNIT
2032 MODULATION UNIT
2033 UPLINK REFERENCE SIGNAL GENERATION UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A base station apparatus that communicates with a terminal apparatus, the base station apparatus comprising:
a transmission unit that transmits, to the terminal apparatus, a first configuration or a second configuration for Channel State Information (CSI) reporting, one piece or a plurality of pieces of information indicating one or a plurality of Channel State Information-Reference Signal (CSI-RS) configurations, and one or a plurality of CSI-RSs for channel measurement corresponding to each of the one piece or the plurality of pieces of information indicating the one or the plurality of CSI-RS configurations; and
a reception unit that receives, from the terminal apparatus, channel state information generated from one CSI-RS among the plurality of CSI-RSs that is selected by the terminal apparatus, and does not receive the channel state information related to any CSI-RS that is not selected by the terminal apparatus, wherein:
the plurality of pieces of information indicating the plurality of CSI-RS configurations comprises information indicating a resource element in a subframe to which a corresponding CSI-RS among the plurality of CSI-RSs is mapped,
in a case where the first configuration is configured and the plurality of pieces of information indicating the plurality of CSI-RS configurations is transmitted, the reception unit receives the channel state information including information indicating one of the plurality of CSI-RS configurations indicated by one of the plurality of pieces of information,
the information indicating the one of the plurality of CSI-RS configurations comprises information corresponding to the one CSI-RS selected by the terminal apparatus and used to generate the channel state information,
in a case where the second configuration is configured, a plurality of CSI-RS antenna ports is configured for the one of the plurality of CSI-RS configurations, and
the reception unit receives, from the terminal apparatus, the channel state information generated from at least one CSI-RS antenna port among the plurality of CSI-RS antenna ports selected by the terminal apparatus.

2. The base station apparatus according to claim 1, wherein:
the transmission unit further transmits the one piece of information indicating the one CSI-RS configuration to the terminal apparatus, and
in a case where the first configuration is configured and the one piece of information indicating the one CSI-RS configuration is transmitted, the channel state information comprises at least one of a channel quality indicator, a precoding matrix indicator, a rank indicator and a precoding type indicator.

3. The base station apparatus according to claim 1, wherein in the case where the first configuration is configured and the plurality of pieces of information indicating the plurality of CSI-RS configurations is transmitted, the information indicating the one of the plurality of CSI-RS configurations comprises a value that is configured sequentially for the plurality of pieces of information indicating the plurality of CSI-RS configurations.

4. The base station apparatus according to claim 1, wherein:
the plurality of CSI-RSs is beam-formed to be transmitted, and
a different beam forming pattern is applied to at least one of the plurality of CSI-RSs.

5. The base station apparatus according to claim 1, wherein in the case where the first configuration is configured and the plurality of pieces of information indicating the plurality of CSI-RS configurations is transmitted, the reception unit further receives at least one or more of a channel quality indicator, a precoding matrix indicator, and a rank indicator.

6. The base station apparatus according to claim 5, wherein the channel quality indicator is calculated based on the information indicating the one of the plurality of CSI-RS configurations.

7. The base station apparatus according to claim 5, wherein the reception unit receives the information indicating the one of the plurality of CSI-RS configurations and the rank indicator in a same subframe.

8. The base station apparatus according to claim 5, wherein the reception unit receives the information indicating the one of the plurality of CSI-RS configurations, the rank indicator, and the precoding matrix indicator in a same subframe.

9. The base station apparatus according to claim 5, wherein the reception unit receives the information indicating the one of the plurality of CSI-RS configurations, the rank indicator, and a precoding type indicator in a same subframe.

10. A terminal apparatus that communicates with a base station apparatus, the terminal apparatus comprising:
a reception unit that receives, from the base station apparatus, a first configuration or a second configuration for Channel State Information (CSI) reporting, one piece or a plurality of pieces of information indicating one or a plurality of Channel State Information-Reference Signal (CSI-RS) configurations, and one or a plurality of CSI-RSs for channel measurement corresponding to each of the one piece or the plurality of pieces of information indicating the one or the plurality of CSI-RS configurations;
a channel state information generation unit that generates channel state information from the plurality of CSI-RSs; and
a transmission unit that transmits, to the base station apparatus, the channel state information, wherein:
the plurality of pieces of information indicating the plurality of CSI-RS configurations comprises information indicating a resource element in a subframe to which a corresponding CSI-RS among the plurality of CSI-RSs is mapped,
in a case where the first configuration is configured and the reception unit receives the plurality of pieces of information indicating the plurality of CSI-RS configurations, the channel state information generation unit selects one CSI-RS among the plurality of CSI-RSs and generates the channel state information from the selected one CSI-RS, the channel state information including information indicating one of the plurality of CSI-RS configurations indicated by one of the plurality of pieces of information,
the information indicating the one of the plurality of CSI-RS configurations comprises information corresponding to the one CSI-RS selected by the channel state information generation unit and used to generate the channel state information,
in a case where the second configuration is configured, a plurality of CSI-RS antenna ports is configured for the one of the plurality of CSI-RS configurations, and
the transmission unit transmits, to the base station apparatus, the channel state information generated from at least one CSI-RS antenna port among the plurality of CSI-RS antenna ports selected by the terminal apparatus.

11. The terminal apparatus according to claim 10, wherein in a case where the first configuration is configured and the reception unit receives the one piece of information indicating the one CSI-RS configuration, the channel state information comprises at least one of a channel quality indicator, a precoding matrix indicator, a rank indicator and a precoding type indicator.

12. The terminal apparatus according to claim 10, wherein in the case where the first configuration is configured and the reception unit receives the plurality of pieces of information indicating the plurality of CSI-RS configurations, the information indicating the one of the plurality of CSI-RS configurations comprises a value that is configured sequentially for the information indicating the plurality of CSI-RS configurations.

13. The terminal apparatus according to claim 10, wherein:
the plurality of CSI-RSs comprises a plurality of beamformed CSI-RSs, and
a different beam forming pattern is applied to at least one of the plurality of CSI-RSs.

14. The terminal apparatus according to claim 10, wherein in the case where the first configuration is configured and the reception unit receives the plurality of pieces of information indicating the plurality of CSI-RS configurations, the transmission unit transmits the channel state information including the information indicating the one of the plurality of CSI-RS configurations, and at least one or more of a channel quality indicator, a precoding matrix indicator, and a rank indicator.

15. The terminal apparatus according to claim 14, wherein the channel quality indicator is calculated based on the information indicating the one of the plurality of CSI-RS configurations.

16. The terminal apparatus according to claim 14, wherein:
the channel state information generation unit further generates the rank indicator, and
the transmission unit transmits the information indicating the one of the plurality of CSI-RS configurations and the rank indicator in a same subframe.

17. The terminal apparatus according to claim 14, wherein:
the channel state information generation unit further generates the rank indicator and the precoding matrix indicator, and
the transmission unit transmits the information indicating the one of the plurality of CSI-RS configurations, the rank indicator, and the precoding matrix indicator in a same subframe.

18. The terminal apparatus according to claim 14, wherein:
the channel state information generation unit further generates the rank indicator and a precoding type indicator, and
the transmission unit transmits the information indicating one of the plurality of CSI-RS configurations, the rank indicator, and the precoding type indicator in a same subframe.

19. A communication method fora base station apparatus that communicates with a terminal apparatus, the communication method comprising:
transmitting, to the terminal apparatus, a first configuration or a second configuration for Channel State Information (CSI) reporting, one piece or a plurality of pieces of information indicating one or a plurality of Channel State Information-Reference Signal (CSI-RS) configurations, and one or a plurality of CSI-RSs for channel measurement corresponding to each of the one piece or the plurality of pieces of information indicating the one or the plurality of CSI-RS configurations; and receiving, from the terminal apparatus, channel state information generated from one CSI-RS among the plurality of CSI-RSs that is selected by the terminal apparatus, and not receiving the channel state information related to any CSI-RS that is not selected by the terminal apparatus, wherein:

the plurality of pieces of information indicating the plurality of CSI-RS configurations comprises information indicating a resource element in a subframe to which a corresponding CSI-RS among the plurality of CSI-RSs is mapped, in a case where the first configuration is configured and the plurality of pieces of information indicating the plurality of CSI-RS configurations is transmitted, receiving the channel state information including information indicating one of the plurality of CSI-RS configurations indicated by one of the plurality of pieces of information, the information indicating the one of the plurality of CSI-RS configurations comprises information corresponding to the one CSI-RS selected by the terminal apparatus and used to generate the channel state information, in a case where the second configuration is configured, configuring a plurality of CSI-RS antenna ports for the one of the plurality of CSI-RS configurations, and receiving, from the terminal apparatus, the channel state information generated from at least one CSI-RS antenna port among the plurality of CSI-RS antenna ports selected by the terminal apparatus.

20. A communication method for a terminal apparatus that communicates with a base station apparatus, the communication method comprising:

receiving, from the base station apparatus, a first configuration or a second configuration for Channel State Information (CSI) reporting, one piece or a plurality of pieces of information indicating one or a plurality of Channel State Information-Reference Signal (CSI-RS) configurations, and one or a plurality of CSI-RSs for channel measurement corresponding to each of the one piece or the plurality of pieces of information indicating the one or the plurality of CSI-RS configurations;

generating channel state information from the plurality of CSI-RSs; and transmitting, to the base station apparatus, the channel state information, wherein:

the plurality of pieces of information indicating the plurality of CSI-RS configurations comprises information indicating a resource element in a subframe to which a corresponding CSI-RS among the plurality of CSI-RSs is mapped, in a case where the first configuration is configured and the plurality of pieces of information indicating the plurality of CSI-RS configurations is received, selecting one CSI-RS among the plurality of CSI-RSs and generating the channel state information from the selected one CSI-RS, the channel state information including information indicating one of the plurality of CSI-RS configurations indicated by one of the plurality of pieces of information, the information indicating the one of the plurality of CSI-RS configurations comprises information corresponding to the one CSI-RS selected by the terminal apparatus and used to generate the channel state information, in a case where the second configuration is configured, configuring a plurality of CSI-RS antenna ports for the one of the plurality of CSI-RS configurations, and transmitting, to the base station apparatus, the channel state information generated from at least one CSI-RS antenna port among the plurality of CSI-RS antenna ports selected by the terminal apparatus.

* * * * *